US012717966B2

(12) United States Patent
Maharaja et al.

(10) Patent No.: US 12,717,966 B2
(45) Date of Patent: Aug. 25, 2026

(54) INTELLIGENT FABRICATION OF SECURED DATA THROUGH SMART PHASE CHANGE MEMORY (PCM) COMPUTING

(71) Applicant: Bank of America Corporation, Charlotte, NC (US)

(72) Inventors: Raja Arumugam Maharaja, Chennai (IN); Arthur Rounbehler, Griswold, CT (US); Vignesh M, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 106 days.

(21) Appl. No.: 18/782,266

(22) Filed: Jul. 24, 2024

(65) Prior Publication Data

US 2026/0030385 A1 Jan. 29, 2026

(51) Int. Cl.
*G06F 21/62* (2013.01)
*G06F 21/55* (2013.01)

(52) U.S. Cl.
CPC ........ *G06F 21/6254* (2013.01); *G06F 21/554* (2013.01)

(58) Field of Classification Search
CPC ............... G06F 21/6254; G06F 21/554; G06F 21/6245; G06N 20/00; G11C 13/06; G11C 7/1006
See application file for complete search history.

(56) References Cited

U.S. PATENT DOCUMENTS 8,782,343 B2 7/2014 Nagpal et al.
11,322,202 B1 * 5/2022 Gong .................. H10N 70/063
(Continued)

FOREIGN PATENT DOCUMENTS

CN 110045919 A 7/2019
DE 112019006784 T5 11/2021
(Continued)

OTHER PUBLICATIONS

Laura Castanon 'New candidate for universal memory is fast, low-power, stable, and long-lasting', published Jan. 22, 2024, 4 pages, retrieved from https://news.stanford.edu/stories/2024/01/closing-universal-memory-large-data-processing (Year: 2024).*

*Primary Examiner* — Catherine Thiaw
*Assistant Examiner* — Amir Mahdi Hajiabbasi
(74) *Attorney, Agent, or Firm* — Banner & Witcoff, Ltd.

(57) ABSTRACT

Systems and methods for intelligent data sanitization employing PCM and AI/ML are provided. The idea uses AI/ML to detect specific facts that needs sanitization rather than full properties in incoming records. Data sanitization is optimized using this focused method, saving computational resources. To properly manage changing data volumes, PCM shifts between Logical 0 and Logical 1 states. Logical 0 processes smaller volumes with high resistance and low conductivity, while Logical 1 processes large volumes with low resistance and high conductivity. The AI/ML module organizes and directs data to maximize resource and processing efficiency. The PCM processes data in-memory and directly overwrites, eliminating erasure. AI/ML and PCM integrate to sanitize data quickly, efficiently, and securely, improving system performance and data integrity without a central repository. The system dynamically adjusts to changing data patterns, protecting and optimizing data.

20 Claims, 7 Drawing Sheets

(56) References Cited

U.S. PATENT DOCUMENTS 11,373,006 B2 * 6/2022 Kurian .................. G06F 40/284
11,675,503 B1 * 6/2023 Ekins .................... G06F 3/0637
711/163
12,499,267 B2 * 12/2025 Sahu ................... G06F 21/6245
2014/0365743 A1 12/2014 Pronozuk et al.
2020/0349271 A1 * 11/2020 Binkley ................. G06N 3/084
2022/0129583 A1 * 4/2022 Balasubramanian .. G06N 20/00
2022/0222570 A1 * 7/2022 Rout ...................... G06N 3/084
2022/0253558 A1 * 8/2022 Jones .................... G06F 16/285
2022/0335158 A1 * 10/2022 Xu ...................... G06F 21/6254
2023/0344871 A1 10/2023 Smith et al.
2023/0409811 A1 * 12/2023 Vanciu .................. G06F 40/166
2024/0111891 A1 * 4/2024 Natili .................. G06F 21/6254
2024/0143229 A1 5/2024 Raquibuzzaman et al.
2025/0039134 A1 * 1/2025 Roquemore ........ H04L 63/0236
2025/0045451 A1 * 2/2025 Ramakrishnan ....... G06N 20/10
2025/0103749 A1 * 3/2025 Weston-Lewis .... G06F 21/6245
2025/0335811 A1 * 10/2025 Soni ....................... G06N 20/00

FOREIGN PATENT DOCUMENTS

DE 112020006443 T5 12/2022
JP 7000491 B2 1/2022
KR 20160016481 A 2/2016

* cited by examiner

150: Input Data

| Attribute 1 | Attribute 2 | Attribute 3 |
|---|---|---|
| JOHN | ACBGD | 358790 |
| MARK | IURLP | 24680 |
| LUKE | KYEFSDY | 13579 |
| ARUN | MHCYEK | 213243 |
| KRISH | NBCYE | 546576 |
| MARY | YTEDC | 91256 |
| PHIL | OBDET | 95632 |

154: Performing Sanitization

| Attribute 1 | Attribute 2 | Attribute 3 |
|---|---|---|
| JOHN | XFETU | 358790 |
| MARK | IURLP | 24680 |
| LUKE | KYEFSDY | 13579 |
| ARUN | MHCYEK | 213243 |
| KRISH | NBCYE | 456321 |
| MARY | YTEDC | 91256 |
| PHIL | PMBCR | 95632 |

500: Input Data

| Attribute 1 | Attribute 2 | Attribute 3 |
| --- | --- | --- |
| JOHN | XFETU | 358790 |
| MARK | IURLP | 24680 |
| LUKE | KYEFSDY | 13579 |
| ARUN | MHCYEK | 213243 |
| KRISH | NBCYE | 456321 |
| MARY | YTEDC | 91256 |
| PHIL | PMBCR | 95632 |

INTELLIGENT FABRICATION OF SECURED DATA THROUGH SMART PHASE CHANGE MEMORY (PCM) COMPUTING

TECHNICAL FIELD

The present invention relates to the field of advanced memory systems and intelligent data processing techniques. Specifically, it pertains to the utilization of Phase Change Memory (PCM) for in-memory computing to achieve efficient and secure data sanitization and fabrication. The invention leverages artificial intelligence (AI) and machine learning (ML) modules to intelligently categorize and process incoming records, identifying sensitive data that requires sanitization. The PCM technology facilitates rapid read and write operations with its bit-alterable capability, enhancing the speed and efficiency of data processing compared to traditional memory systems. By integrating AI/ML models, the invention eliminates the need for a central repository, reducing the resource burden and improving overall system performance. The intelligent switching between logical states within the PCM based on the volume of data ensures optimal handling of records. This technical solution addresses challenges in data privacy and security, making it highly relevant to fields involving non-volatile memory, in-memory computing, and information security.

DESCRIPTION OF THE RELATED ART

In the realm of data processing, particularly in environments handling vast amounts of sensitive and non-sensitive data, maintaining data privacy and security poses significant challenges. Data processing often involves numerous steps where personal information (PI) must be protected from exposure during coding and transformation activities. Typically, data tables contain a mixture of sensitive data, such as PI columns, and non-sensitive data, which together are subjected to various transformation processes. These processes expose sensitive data to different teams and systems, increasing the risk of data breaches and privacy violations.

A significant issue in current data processing systems is the inefficiency in identifying and sanitizing sensitive data. The conventional approach involves checking every incoming record to determine if it requires sanitization, a process that consumes substantial computational resources and time. This validation step is redundant and often leads to delays as each record must be individually analyzed. Additionally, the process of mapping sanitized and unsanitized data within a central repository adds to the complexity, requiring extensive storage and retrieval operations that further slowdown the system.

Furthermore, existing systems lack an intelligent mechanism to quickly and accurately identify records that need sanitization. The absence of such a mechanism results in prolonged processing times, as the system must perform a thorough search through all records, whether or not they require sanitization. This exhaustive search process not only delays data processing but also increases the load on computational resources, leading to inefficiencies and potential bottlenecks in the system.

Another problem is the reliance on central repositories to store and manage references of sanitized data. These repositories become a single point of failure and can lead to significant performance issues as the volume of data grows. The continuous need to access and update the central repository introduces latency and resource contention, negatively impacting the overall system performance. Moreover, the management of these repositories demands substantial storage capacity and maintenance efforts, adding to the operational costs.

Traditional data processing systems also face limitations in terms of scalability and flexibility. As the amount of data increases, the system's ability to efficiently process and sanitize this data diminishes. The existing methods do not adapt well to varying data volumes, leading to either over-utilization or under-utilization of resources. This lack of adaptability results in inefficient use of computational power and delays in processing, especially when dealing with large datasets.

Data sanitization processes in conventional systems are also prone to errors and inconsistencies. The manual and repetitive nature of these processes increases the likelihood of human error, leading to potential data leaks and compromised data integrity. Ensuring consistency in data sanitization across different datasets and transformation processes is challenging, requiring meticulous validation and verification steps that further slowdown the overall process.

Moreover, traditional systems often erase existing data when new data needs to be written, which is not efficient for applications requiring frequent updates and modifications. This approach increases the time taken for data processing and adds unnecessary wear and tear to storage devices. The inability to overwrite bits directly in the memory blocks without erasing existing data results in slower processing times and reduced system efficiency.

Another critical issue is the lack of real-time processing capabilities in conventional systems. The delay in identifying and sanitizing sensitive data means that the data is exposed for a longer period, increasing the risk of unauthorized access and data breaches. Real-time processing is essential for applications that require immediate data sanitization to ensure data privacy and security.

The increasing complexity of data transformation logic also adds to the challenge. As new data columns and attributes are introduced, the system must search and process millions of records to identify and sanitize the relevant data. This process is time-consuming and resource-intensive, making it difficult to maintain data privacy in dynamic and evolving data environments.

The long-felt and unmet need for this invention arises from the growing demand for efficient, scalable, and intelligent data processing solutions that ensure data privacy and security. Current methods are inadequate in handling the increasing volume and complexity of data, leading to inefficiencies, delays, and potential data breaches. There is a pressing need for a system that can intelligently and rapidly identify sensitive data for sanitization, reduce the dependency on central repositories, and provide real-time processing capabilities. Such a system would significantly improve data processing efficiency, enhance data privacy, and reduce operational costs, addressing the critical challenges faced by modern data processing environments.

SUMMARY OF THE INVENTION

The invention described addresses the inefficiencies and high resource demands of traditional data sanitization processes by integrating Artificial Intelligence (AI), Machine Learning (ML), and Phase Change Memory (PCM) technology to create an intelligent, in-memory data processing system. This system is designed to dynamically and efficiently sanitize sensitive data, ensuring data privacy and security while minimizing resource usage.

In conventional data processing environments, data sanitization, also known as data masking or data fabrication, involves transforming sensitive personal information (PI) into a non-sensitive format. This process is essential to prevent unauthorized access or misuse of data. However, existing methods are often resource-intensive, involving complex processes to validate and determine which data needs sanitization. These methods typically rely on central repositories to store sanitized data, leading to redundancy and inefficiency.

The invention begins with an input file containing both personal (PI) and non-personal information (NPI). The input file is passed through a central repository or Kafka, a distributed streaming platform, which triggers a search request to the hard drive or other computer-readable medium. The ML model then performs an intelligent search to determine whether the input data contains sensitive information that needs sanitization. Kafka is a highly scalable and durable messaging system that handles real-time data feeds, ensuring that the data is efficiently managed and processed.

Once the data is identified, the AI/ML module segregates the data into records that need to be sanitized and those that do not. AI refers to the simulation of human intelligence in machines, enabling them to perform tasks that typically require human intelligence, such as learning and problem-solving. ML, a subset of AI, involves training algorithms on data so that the system can make predictions or decisions without being explicitly programmed. In this invention, the AI/ML module continuously learns from the data, improving its accuracy in identifying sensitive information over time.

During initial iterations, the AI/ML module is manually trained to recognize sensitive data attributes. For example, if a table contains both sensitive and non-sensitive columns, the AI/ML module is trained to identify which columns need sanitization. This training involves feeding the module examples of sensitive and non-sensitive data and providing feedback on its performance. As the system evolves, it autonomously identifies and processes data with increasing accuracy, reducing the need for manual intervention.

The intelligent segregation process ensures that only the necessary records are processed, reducing the computational load on the system. The AI/ML module analyzes incoming data and categorizes it based on whether it needs to be sanitized. This categorization is crucial because it prevents unnecessary processing of data that does not require sanitization, thus conserving resources and improving efficiency.

The system also employs intelligent routing to determine whether the volume of incoming data exceeds a certain threshold, preferably predetermined and can be adjusted dynamically on the fly if desired based on hardware performance increases or observed system performance. If the data volume is high, the system sets PCM to Logical 1, indicating that the memory is in a state suitable for processing large volumes of data. Conversely, if the data volume is low, it sets PCM to Logical 0, indicating a state suitable for processing smaller volumes of data. This dynamic switching allows the system to handle varying data volumes efficiently, ensuring that resources are optimally utilized.

PCM is a type of non-volatile memory that uses the physical state change between amorphous and crystalline states to store data. Non-volatile memory retains data even when the power is turned off, making it ideal for applications that require long-term data storage. PCM technology allows for in-memory processing, meaning that data can be processed and stored within the same memory unit. This reduces the time and resources required for data handling, as there is no need to transfer data between separate processing and storage units.

Logical 1 and Logical 0 represent the two states of PCM. Logical 1 (crystalline state) is characterized by low resistance and high conductivity, making it suitable for handling large volumes of data. Logical 0 (amorphous state) is characterized by high resistance and low conductivity, making it suitable for handling smaller volumes of data. The ability to dynamically switch between these states allows the system to efficiently manage data processing based on the volume of data being handled.

The AI/ML module continuously improves its accuracy in identifying sensitive data through iterative training. Initially, the module is manually trained to recognize sensitive data attributes. Over time, it autonomously identifies and processes data with increasing accuracy, reducing the need for manual intervention. The PCM module, with its in-memory computing capabilities, processes the identified data rapidly. Unlike traditional memory systems that require data to be erased before writing new data, PCM can overwrite existing data directly, enhancing processing speed and reducing resource usage.

In the conventional data processing scenario, sanitized and unsanitized data are often stored in a central repository. This central repository must continually validate incoming data to determine if it needs to be sanitized, a process that is both time-consuming and resource intensive. The invention eliminates the need for such a central repository by allowing the PCM, guided by the AI/ML module, to handle data processing and sanitization internally. This reduces the overhead associated with maintaining and querying a central repository.

The AI/ML module not only identifies which data needs to be sanitized but also learns the patterns and characteristics of sensitive data over time. This learning process involves analyzing large datasets and recognizing which attributes are sensitive. For instance, personal identifiers such as Social Security numbers, credit card information, and addresses are flagged as sensitive and prioritized for sanitization. This intelligent identification is crucial for efficiently managing large volumes of data and ensuring that only the necessary data is processed.

Another key advantage of the PCM technology is its ability to perform in-memory computations. Traditional systems often rely on CPUs to process data and then store the results in separate memory units. This two-step process can be slow and resource intensive. In contrast, PCM can perform computations within the memory itself, significantly speeding up the data processing and sanitization tasks. This capability is particularly beneficial when dealing with large datasets that require quick turnaround times.

The AI/ML module also helps in dynamically adjusting the processing load on the PCM. By categorizing the incoming data based on its volume and sensitivity, the AI/ML module ensures that the PCM is not overloaded with unnecessary processing tasks. For example, if a large dataset contains only a small amount of sensitive data, the AI/ML module can direct the PCM to focus only on the sensitive portions, thereby optimizing the processing efficiency.

In addition to optimizing the processing load, the AI/ML module can also predict future data patterns based on historical data. This predictive capability allows the system to preemptively allocate resources and adjust its processing strategies. For instance, if the system detects an increasing trend in the volume of sensitive data, it can preemptively set the PCM to Logical 1 to handle the anticipated load. This proactive approach further enhances the system's efficiency and responsiveness.

The non-volatile nature of PCM also ensures data integrity and reliability. Since PCM retains data even when the power is turned off, it provides a reliable storage solution for critical and sensitive information. This is particularly important in scenarios where data must be preserved for long periods without risk of loss or corruption. The ability to retain data reliably makes PCM an ideal choice for applications that require high data integrity.

The invention also incorporates a feedback loop between the AI/ML module and the PCM. This feedback loop allows the system to continuously improve its performance and adapt to changing data patterns. As the AI/ML module processes more data and gains more experience, it can provide real-time feedback to the PCM on how to adjust its processing strategies. This continuous improvement cycle ensures that the system remains efficient and effective over time.

A significant feature of the invention is its ability to handle both large and small volumes of data with equal efficiency. The dynamic switching between Logical 1 and Logical 0 states in the PCM allows the system to optimize its resources based on the current data load. This flexibility ensures that the system can scale up to handle large datasets without sacrificing performance when dealing with smaller datasets. This scalability is crucial for modern data processing environments that often experience fluctuating data volumes.

Furthermore, the system's intelligent data routing capabilities ensure that only the necessary data is processed. By using AI/ML to pre-screen and categorize data, the system avoids the unnecessary processing of non-sensitive data. This selective processing not only conserves resources but also speeds up the overall data sanitization process. The ability to quickly and accurately identify and process only the necessary data is a significant improvement over traditional methods that often involve processing entire datasets regardless of their sensitivity.

Another advantage of the invention is its ability to perform data sanitization without the need to erase existing data. Traditional memory systems typically require data to be erased before new data can be written, which can be time-consuming and resource intensive. In contrast, PCM's ability to overwrite existing data directly allows for faster data processing and reduces the wear and tear on memory units. This direct overwrite capability enhances the system's overall efficiency and longevity.

The system's architecture also includes a mechanism for real-time data updates. Once the data is processed and sanitized, it can be immediately sent back to the hard drive or database for storage. This real-time update capability ensures that the most current data is always available, enhancing the system's reliability and usefulness. In fast-paced data processing environments, having access to the latest data is crucial for making timely and informed decisions.

Security is another critical aspect of the invention. By integrating AI/ML with PCM, the system can provide a higher level of data security compared to traditional methods. The AI/ML module's ability to learn and adapt means that it can identify and respond to new security threats in real time. Additionally, the in-memory processing capabilities of PCM reduce the risk of data breaches since sensitive data does not need to be transferred between different processing and storage units. This integrated approach ensures that sensitive data is protected throughout the entire processing cycle.

The invention's ability to eliminate the need for a central repository also enhances security. Central repositories can be vulnerable to attacks and data breaches, as they are often the single point of failure in data processing systems. By distributing the data processing and storage tasks within the PCM and leveraging AI/ML for intelligent data management, the system reduces the risk associated with central repositories. This decentralized approach enhances the overall security and robustness of the system.

In conclusion, this invention leverages the unique properties of PCM and the analytical power of AI/ML to create an intelligent, efficient system for data sanitization. By integrating AI/ML with PCM technology, the system can dynamically and efficiently manage data sanitization, ensuring data privacy and security while minimizing resource usage. This innovative approach addresses the limitations of traditional data sanitization methods, offering a faster, more efficient, and more secure solution for managing sensitive data. The invention's ability to handle large and small data volumes, perform in-memory processing, provide real-time updates, and enhance security makes it a valuable tool for modern data processing environments.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

The core inventive features of this system revolve around the integration of Artificial Intelligence (AI), Machine Learning (ML), and Phase Change Memory (PCM) technology to create an advanced and efficient data sanitization solution. This system intelligently manages the sanitization process, ensuring data privacy and security while optimizing resource usage.

At the core of the invention is an AI/ML-powered model designed to process incoming records for sanitization. AI involves the simulation of human intelligence in machines, enabling them to perform complex tasks such as learning and problem-solving. ML, a subset of AI, trains algorithms on data to allow the system to make informed decisions and predictions. This AI/ML model meticulously analyzes incoming data to identify records that require sanitization, ensuring precision and efficiency in the data processing workflow.

The system incorporates a sophisticated PCM framework, which uses a type of non-volatile memory characterized by its ability to switch between two physical states: amorphous and crystalline. This state change is utilized to store data efficiently. The AI/ML module intelligently manages the PCM, programming it to switch between Logical 0 (amorphous state) and Logical 1 (crystalline state) based on the volume and type of data that needs to be sanitized. Logical 0 is characterized by high resistance and low conductivity, suitable for smaller data volumes, while Logical 1, with low resistance and high conductivity, is ideal for processing larger volumes of data.

The AI/ML module plays a crucial role in identifying which records need to be sanitized. Unlike traditional approaches that may sanitize entire attributes, this system focuses on specific data within each attribute that needs protection. By doing so, it reduces the amount of data that requires processing, thereby conserving computational resources and enhancing efficiency.

Volume-based dynamic switching is another key feature of the system. Depending on the data volume, the AI/ML module dynamically adjusts the PCM state to Logical 1 for high volumes and Logical 0 for lower volumes. This adaptability ensures that the system operates at optimal efficiency, regardless of the data load.

The PCM is equipped with internal memory capabilities that allow it to identify whether a record has already been sanitized. This internal iteration prevents redundant processing, ensuring that each record is sanitized only once. The PCM's ability to handle this internally significantly enhances the system's overall efficiency.

When the PCM identifies records that need sanitization, it triggers the necessary logic to perform the transformation. After sanitization, the data is promptly sent to the database or hard drive for storage. This streamlined process ensures that data is sanitized and stored efficiently, maintaining data integrity and availability.

The system's design ensures efficient resource utilization. The AI/ML module provides quick access to incoming records, minimizing the use of system resources. This efficiency is achieved through intelligent data processing that dynamically adjusts based on the data volume and type.

PCM technology allows for in-memory computing, a significant advantage over traditional systems. Traditional systems typically process data using a CPU and then store it in separate memory units. PCM, however, processes and stores data within the same memory block, reducing the time and resources needed for data handling. This integration of processing and storage enhances the system's overall performance.

Direct overwrite capability is another innovative feature of PCM. Traditional memory systems require existing data to be erased before new data can be written, a process that can be time-consuming and resource intensive. PCM allows data to be directly overwritten, reducing processing time and minimizing resource burden. This capability is particularly beneficial for environments that require fast and efficient data processing.

The AI/ML module intelligently categorizes and sorts incoming records, identifying specific data that needs sanitization. This segregation ensures that only the necessary records are processed, optimizing system performance and conserving resources. The AI/ML module's ability to dynamically invoke Logical 1 for handling larger volumes of data and Logical 0 for smaller volumes further enhances this efficiency.

Once records are in the PCM, they undergo a quick re-check against existing data in the memory to ensure they have not been previously sanitized. This real-time validation prevents redundant processing and ensures data integrity. The system's capability to handle these checks internally within the PCM boosts overall efficiency.

The PCM also manages sanitization techniques within its memory blocks, performing real-time data processing. Once sanitized, the data is sent to the hard drive or database for storage. This immediate update capability ensures that the most current data is always available, enhancing the system's reliability and effectiveness.

By leveraging AI/ML and PCM technologies, the system eliminates the need for a central repository. Traditional systems often rely on a central repository to store references for data sanitization, which can be a single point of failure and a security risk. This invention's decentralized approach reduces these risks and enhances overall system security and robustness.

The integration of AI/ML with PCM not only enhances data security but also improves the system's efficiency. The AI/ML module's ability to learn and adapt allows it to identify and respond to new data patterns and security threats in real time. The in-memory processing capabilities of PCM ensure fast and efficient data handling, making this system a significant advancement over traditional data sanitization methods. This innovative approach addresses the limitations of existing methods, offering a more secure, efficient, and reliable solution for managing sensitive data.

In some arrangements, an AI/ML method for intelligent fabrication of secured data through smart Phase Change Memory (PCM) computing comprises the following steps. First, an input file containing both personal information and non-personal information data is received. This input file is then passed through a central repository. A search request is triggered to identify sensitive data within the central repository, and an intelligent search is performed using a machine learning (ML) model to identify records containing sensitive information. The records containing sensitive information are then segregated into segregated sensitive records using an artificial intelligence (AI) and ML module. These segregated sensitive records are routed based on the volume of data. It is determined if the volume of data exceeds a predefined threshold. If the volume exceeds the predefined threshold, the PCM is set to a logical '1' state, characterized by low resistance and high conductivity, for high data volume. If the volume does not exceed the predefined threshold, the PCM is set to a logical '0' state, characterized by high resistance and low conductivity, for low data volume. The segregated sensitive records are processed within the PCM, and the PCM dynamically switches between logical '1' and logical '0' states based on the volume of data. In-memory processing is performed within the PCM to sanitize the segregated sensitive records. Existing data is overwritten directly in the PCM without traditional erasure processes. Real-time validation is performed to determine whether the segregated sensitive records have been sanitized. The sanitized data is then sent back to the centralized repository for storage and is displayed in an output format for final verification.

In some arrangements, a method for intelligent fabrication of secured data through smart Phase Change Memory (PCM) computing comprises the following steps. An input file containing both personal information and non-personal information data is received, wherein the personal information includes sensitive attributes such as names, addresses, Social Security numbers, and financial information, and the non-personal information includes general, non-sensitive data. This input file is passed through a central repository, which organizes and stores the incoming data for efficient access and processing. A search request is triggered to identify sensitive data in the central repository, utilizing metadata indexing and search algorithms to locate records containing personal information. An intelligent search is performed using a machine learning (ML) model to identify records containing sensitive information in the central repository, where the ML model is trained on labeled datasets of sensitive and non-sensitive data to enhance its accuracy and efficiency in identifying sensitive records. The records containing sensitive information are segregated into segregated sensitive records using an artificial intelligence (AI) and ML module, which analyzes the identified records to separate sensitive data from non-sensitive data. The segregated sensitive records are routed based on a volume of data, determining the appropriate processing path for each record based on its data volume. It is determined if the volume of data exceeds a predefined threshold, which is set to differentiate between high-volume and low-volume data processing requirements.

If the volume exceeds the predefined threshold, the PCM is set to a logical '1' state for high data volume, characterized by low resistance and high conductivity, to facilitate rapid data transactions and high throughput. If the volume does not exceed the predefined threshold, the PCM is set to a logical '0' state for low data volume, characterized by high resistance and low conductivity, to ensure precise data handling with controlled resistance levels suitable for smaller datasets. The segregated sensitive records are processed within the PCM, using in-memory computing capabilities to sanitize the data without the need for data transfers between processing and storage units. The PCM dynamically switches between logical '1' and logical '0' states based on the volume of data, optimizing resource usage and processing efficiency for varying data loads. In-memory processing is performed within the PCM to sanitize the segregated sensitive records, applying appropriate current levels to switch the PCM states and achieve the desired data sanitization. Existing data is overwritten directly in the PCM without traditional erasure processes, allowing for faster data updates and reduced wear and tear on the memory units. Real-time validation is performed to determine whether the segregated sensitive records have been sanitized, using validation algorithms to ensure data integrity and prevent redundant processing.

The PCM's internal memory is utilized to keep track of which records have been sanitized, preventing redundant processing and ensuring that each record is only processed once. In-memory computations are performed within the PCM to handle data transformations and sanitization, reducing the need for data transfers between processing and storage units, thereby minimizing latency and enhancing overall processing speed. The AI/ML module predicts future data patterns based on historical data, enabling the system to preemptively allocate resources and adjust its processing strategies, thus improving its responsiveness and efficiency in handling fluctuating data volumes.

Feedback from the AI/ML module can be incorporated to adjust the PCM processing parameters dynamically, ensuring that the system remains adaptive and responsive to changing data characteristics and processing requirements. Security protocols are integrated within the AI/ML module to detect and respond to potential data breaches or anomalies in real-time, ensuring that sensitive data is protected throughout the processing cycle and enhancing the overall security of the system. Sanitized data is sent back to the centralized repository for storage, ensuring that the sanitized data is securely stored and accessible for future use. A mechanism for real-time updates and synchronization of sanitized data across multiple databases is included, ensuring that all data repositories maintain consistent and up-to-date records, thereby improving data reliability and accessibility for end-users. Finally, the sanitized data is displayed in an output format for final verification, providing a user interface for operators to review and confirm the accuracy and completeness of the sanitized data.

In some arrangements, the method further comprises the step of training the machine learning model with examples of sensitive and non-sensitive data to improve the accuracy of identifying sensitive records. The training involves feeding the model with labeled datasets and providing feedback on its performance to fine-tune its predictive accuracy, ensuring continuous improvement in the identification process.

In some arrangements, the method includes the artificial intelligence and machine learning module continuously learning and adapting based on the data processed to enhance its capability to segregate sensitive records. This is achieved using iterative training cycles and incorporating new data patterns to refine its classification algorithms, thereby increasing its efficiency and accuracy over time.

In some arrangements, the method further comprises the step of using a distributed streaming platform, Kafka, to efficiently manage and transmit the input file through the central repository. This ensures real-time data streaming and fault tolerance to handle large-scale data input and processing, thereby maintaining system performance and reliability even under heavy loads.

In some arrangements, the method involves triggering the search request to a specific hard drive within the central repository to retrieve the identified sensitive data. This optimizes data retrieval speed and accuracy by targeting specific storage locations based on metadata indexing, thus reducing the time and computational resources required for data search and retrieval.

In some arrangements, the method further comprises displaying the identified sensitive records in the output for initial human verification before routing them based on data volume. A user interface is provided for operators to review and confirm the records identified for sanitization, thereby ensuring an additional layer of verification and quality control.

In some arrangements, the method includes the in-memory processing within the PCM, which applies a high current to switch the PCM to the logical '1' state for handling high data volumes. This facilitates rapid data transactions and high throughput for large-scale data sanitization, thereby enhancing the efficiency of the data processing pipeline.

In some arrangements, the method includes the in-memory processing within the PCM, which applies a low current to switch the PCM to the logical '0' state for handling low data volumes. This ensures precise data handling with controlled resistance levels suitable for smaller datasets, thus maintaining high data integrity and accuracy during processing.

In some arrangements, the method further comprises the step of updating the central repository with sanitized data in real-time to ensure the most current data is available. Asynchronous data synchronization techniques are used to minimize latency and ensure data consistency across the system, thereby improving the overall reliability of the data processing framework.

In some arrangements, the method includes the final verification step of displaying a detailed log of the sanitization process for each record processed to ensure data integrity and accuracy. This includes timestamps, processing steps, and validation results to provide a comprehensive audit trail, enabling thorough review and compliance with data governance policies.

In some arrangements, a system for intelligent fabrication of secured data through smart Phase Change Memory (PCM) computing comprises a data input module configured to receive an input file containing both personal information and non-personal information data, wherein the personal information includes sensitive attributes such as names, addresses, Social Security numbers, and financial information, and the non-personal information includes general, non-sensitive data. The system includes a central repository for organizing and storing the incoming data for efficient access and processing. A search request module is configured to trigger a search request to identify sensitive data in the central repository, utilizing metadata indexing and search algorithms to locate records containing personal information. The system employs a machine learning (ML) model trained on labeled datasets of sensitive and non-sensitive data to perform an intelligent search to identify records containing sensitive information in the central repository. An artificial intelligence (AI) and ML module is configured to segregate the records containing sensitive information into segregated sensitive records by analyzing the identified records to separate sensitive data from non-sensitive data. The system includes a routing module configured to route the segregated sensitive records based on a volume of data, determining the appropriate processing path for each record based on its data volume.

A volume determination module is configured to determine if the volume of data exceeds a predefined threshold, which is set to differentiate between high-volume and low-volume data processing requirements. The PCM module is configured to set the PCM to a logical '1' state for high data volume, characterized by low resistance and high conductivity, if the volume exceeds the predefined threshold, to facilitate rapid data transactions and high throughput. It is also configured to set the PCM to a logical '0' state for low data volume, characterized by high resistance and low conductivity, if the volume does not exceed the predefined threshold, to ensure precise data handling with controlled resistance levels suitable for smaller datasets.

The PCM module processes the segregated sensitive records within the PCM using in-memory computing capabilities to sanitize the data without the need for data transfers between processing and storage units. The PCM module dynamically switches between logical '1' and logical '0' states based on the volume of data to optimize resource usage and processing efficiency for varying data loads. It performs in-memory processing within the PCM to sanitize the segregated sensitive records, applying appropriate current levels to switch the PCM states and achieve the desired data sanitization. The PCM module overwrites existing data directly in the PCM without traditional erasure processes to allow for faster data updates and reduced wear and tear on the memory units. A validation module is configured to validate in real-time whether the segregated sensitive records have been sanitized using validation algorithms to ensure data integrity and prevent redundant processing.

The PCM's internal memory keeps track of which records have been sanitized, preventing redundant processing and ensuring that each record is only processed once. In-memory computations are performed within the PCM to handle data transformations and sanitization, reducing the need for data transfers between processing and storage units, thereby minimizing latency and enhancing overall processing speed. The system includes a prediction module within the AI/ML module configured to predict future data patterns based on historical data, enabling the system to preemptively allocate resources and adjust its processing strategies to improve responsiveness and efficiency in handling fluctuating data volumes. A feedback module within the AI/ML module incorporates feedback to adjust the PCM processing parameters dynamically, ensuring that the system remains adaptive and responsive to changing data characteristics and processing requirements.

An integration module within the AI/ML module integrates security protocols to detect and respond to potential data breaches or anomalies in real-time, ensuring that sensitive data is protected throughout the processing cycle and enhancing the overall security of the system. The system also includes a data storage module configured to send sanitized data back to the centralized repository for storage, ensuring that the sanitized data is securely stored and accessible for future use. A synchronization module provides a mechanism for real-time updates and synchronization of sanitized data across multiple databases, ensuring that all data repositories maintain consistent and up-to-date records, thereby improving data reliability and accessibility for end-users. Finally, an output module displays the sanitized data in an output format for final verification, providing a user interface for operators to review and confirm the accuracy and completeness of the sanitized data.

In some arrangements, the system further comprises the machine learning model being configured to be trained with examples of sensitive and non-sensitive data to improve the accuracy of identifying sensitive records. This training involves feeding the model with labeled datasets and providing feedback on its performance to fine-tune its predictive accuracy, ensuring continuous improvement in the identification process.

In some arrangements, the system includes the artificial intelligence and machine learning module being configured to continuously learn and adapt based on the data processed to enhance its capability to segregate sensitive records. This is achieved using iterative training cycles and incorporating new data patterns to refine its classification algorithms, thereby increasing its efficiency and accuracy over time.

In some arrangements, the system further comprises a distributed streaming platform, Kafka, configured to efficiently manage and transmit the input file through the central repository. This ensures real-time data streaming and fault tolerance to handle large-scale data input and processing, thereby maintaining system performance and reliability even under heavy loads.

In some arrangements, the system includes the search request module being further configured to trigger the search request to a specific hard drive within the central repository to retrieve the identified sensitive data. This optimizes data retrieval speed and accuracy by targeting specific storage locations based on metadata indexing, thus reducing the time and computational resources required for data search and retrieval.

In some arrangements, the system further comprises an initial human verification module configured to display the identified sensitive records in the output for initial human verification before routing them based on data volume. This provides a user interface for operators to review and confirm the records identified for sanitization, thereby ensuring an additional layer of verification and quality control.

In some arrangements, the system includes the PCM module's in-memory processing capability which applies high current to switch the PCM to the logical '1' state for handling high data volumes. This facilitates rapid data transactions and high throughput for large-scale data sanitization, thereby enhancing the efficiency of the data processing pipeline.

In some arrangements, the system includes the PCM module's in-memory processing capability which applies low current to switch the PCM to the logical '0' state for handling low data volumes. This ensures precise data handling with controlled resistance levels suitable for smaller datasets, thus maintaining high data integrity and accuracy during processing.

In some arrangements, the system includes the synchronization module being further configured to update the central repository with sanitized data in real-time to ensure the most current data is available. Asynchronous data synchronization techniques are used to minimize latency and ensure data consistency across the system, thereby improving the overall reliability of the data processing framework.

In some arrangements, the system includes the output module's final verification capability which displays a detailed log of the sanitization process for each record processed to ensure data integrity and accuracy. This includes timestamps, processing steps, and validation results to provide a comprehensive audit trail, enabling thorough review and compliance with data governance policies.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

DETAILED DESCRIPTION

Figures 1A, 1B:
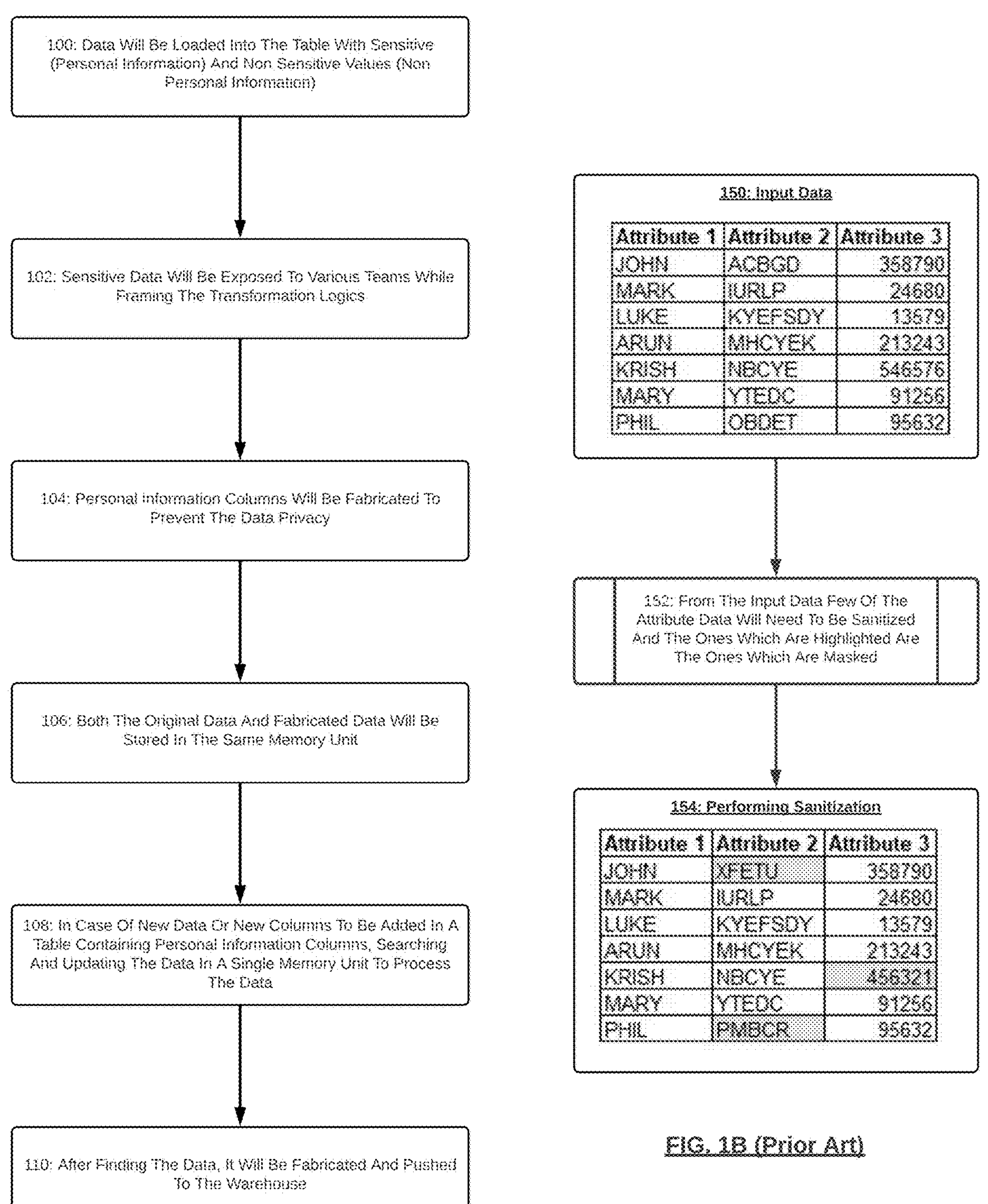
FIGS. 1A-1B shows sample prior art handling of data containing personalized or non-personal information.

In short, the invention provides an advanced system for data sanitization by integrating Phase Change Memory (PCM) technology with Artificial Intelligence (AI) and Machine Learning (ML). It aims to enhance the efficiency and security of data sanitization processes, which are crucial for protecting sensitive personal information (PI).

At a high level, invention works by analyzing incoming data to identify which specific parts need to be sanitized. This is achieved using an AI/ML-powered model that intelligently processes and categorizes the data. Unlike traditional methods that might sanitize entire attributes, this system targets only the necessary data within each attribute, thereby optimizing resource usage.

PCM technology is used to manage and store data. PCM can switch between two states-Logical 0 and Logical 1-based on the volume of data. Logical 0, with high resistance and low conductivity, is used for smaller data volumes, while Logical 1, with low resistance and high conductivity, is suited for larger volumes. This dynamic switching ensures efficient data processing.

The system eliminates the need for traditional erasure processes by allowing PCM to directly overwrite existing data. This feature reduces the time and computational resources typically required for data handling. Additionally, the AI/ML module continuously learns and adapts, improving its accuracy in identifying sensitive data over time.

By performing in-memory data processing and minimizing reliance on a central repository, the invention enhances data integrity, speeds up processing, and reduces security risks. This innovative combination of AI/ML and PCM offers a robust, efficient, and secure solution for data sanitization, suitable for environments handling large and fluctuating volumes of sensitive data.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models—Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models-Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

FIGS. 1A-1B illustrate prior art methodology of handling PI and non-PI data inefficiently.

The flow diagram in FIG. 1A illustrates the traditional process for data sanitization, highlighting several steps that showcase the inherent inefficiencies and limitations of the prior art. This process begins with loading data that contains both sensitive personal information (PI) and non-sensitive values into a table (Step 100). The initial step of importing data into the system is straightforward; however, it sets the stage for the challenges that follow. Sensitive data, such as personal identifiers like Social Security numbers, addresses, and financial information, is mixed with non-sensitive data, requiring careful management to ensure privacy.

The next step involves exposing the sensitive data to various teams during the process of framing transformation logics (Step 102). This step involves multiple teams or systems accessing the data to develop or execute data transformation tasks. The exposure of sensitive information to various stakeholders increases the risk of unauthorized access or misuse, making data privacy a significant concern. This step highlights the lack of control over who accesses the sensitive data, leading to potential security breaches.

To attempt to mitigate privacy risks, albeit an insufficient approach in and of itself, the process includes fabricating personal information columns to prevent data privacy breaches (Step 104). Data fabrication, also known as data masking or sanitization, involves transforming sensitive information into a non-sensitive format. While this step is essential for protecting data, it is resource-intensive and time-consuming. The need to mask or sanitize entire columns of data, rather than targeting specific sensitive elements, leads to inefficiencies in processing and resource allocation.

Both the original and fabricated data are stored in the same memory unit (Step 106). This co-location of data can lead to significant inefficiencies and risks. Managing and protecting both versions of the data within the same memory unit increases the complexity of the data management process. It also raises concerns about potential data breaches, as both the sensitive and non-sensitive versions of the data are stored together.

When new data or new columns are added to a table containing PI columns, the system must search and update the data within a single memory unit (Step 108). This step involves identifying and processing new or updated sensitive information to ensure it is properly sanitized. The requirement to search through the entire memory unit for updates is a time-consuming and resource-heavy process. It also introduces redundancy, as the system may repeatedly process the same data to identify changes, leading to inefficiencies.

After identifying the sensitive data, it is fabricated and then pushed to a data warehouse for storage (Step 110). While this step ensures that sanitized data is securely stored in a central repository, it introduces additional complexity and potential delays. The need to transfer data between different storage systems can lead to bottlenecks and increased processing times. The reliance on a central repository also poses risks, as it can become a single point of failure, vulnerable to attacks and data breaches.

The example in FIG. 1B further illustrates the process of data sanitization by highlighting specific data attributes in an example dataset that needs to be masked (Step 152). This step involves identifying certain attributes within the input data that require sanitization. These attributes are typically highlighted or marked to indicate that they contain sensitive information that must be protected. For example, a dataset may include columns such as names, addresses, and Social Security numbers that need to be masked to ensure privacy. This manual identification process is prone to errors and requires significant oversight, leading to potential gaps in data protection.

The identified attributes are then subjected to the sanitization process (Step 154), which involves transforming the sensitive data into a masked format. While this step is crucial for preventing unauthorized access, it is inherently inefficient. The transformation process is resource-intensive and time-consuming, requiring substantial computational power and memory. Additionally, the need to retain both the original and sanitized versions of the data further complicates the data management process.

Overall, the prior art highlighted in FIG. 1A-1B is ineffective and insufficient for various several reasons. The exposure of sensitive data to multiple teams during transformation increases the risk of unauthorized access. The resource-intensive nature of data fabrication and the co-location of original and sanitized data within the same memory unit introduce inefficiencies and security risks. The process of updating and sanitizing new data entries is time-consuming and prone to redundancy. Finally, the reliance on a central repository for storing sanitized data introduces potential bottlenecks and vulnerabilities. These factors collectively underscore the need for more efficient, secure, and streamlined approaches to data sanitization.

Figure 2:
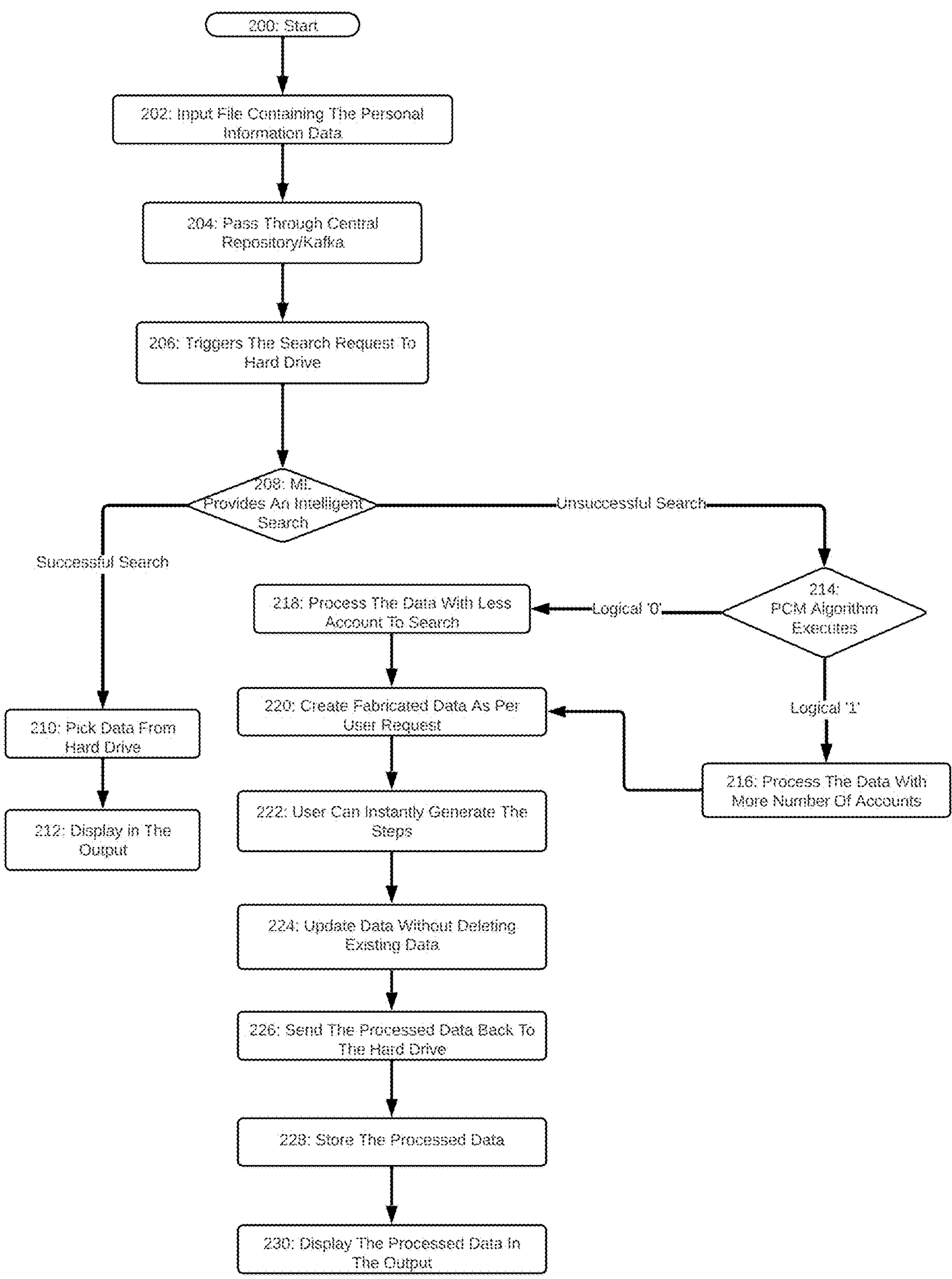
FIG. 2 shows a sample innovative process starting from the input file, passing through the central repository/Kafka, and triggering an intelligent search by the ML model. The data is then processed and displayed in the output. If the search is unsuccessful, the system uses Logical 0 or Logical 1 based on the PCM algorithm to determine the next steps.

FIG. 2 illustrates a sophisticated and detailed process flow for a sample intelligent data sanitization system that utilizes Phase Change Memory (PCM) and Artificial Intelligence/Machine Learning (AI/ML) technologies in accordance with one or more aspects of the invention. The figure presents a comprehensive view of how data is processed, sanitized, and managed within the system to ensure efficiency and security.

The process begins with the initiation step 200, where the system is activated and prepared to handle incoming data. The starting point marks the beginning of a highly automated and intelligent workflow designed to manage sensitive information effectively. In step 202, the system receives an input file containing personal information data. This input file is critical as it includes sensitive attributes such as names, addresses, Social Security numbers, and financial information, all of which need protection from unauthorized access and potential misuse.

Once the input file is received, it proceeds to step 204, where it is passed through a central repository or a Kafka system. Kafka, a distributed streaming platform known for its high scalability and fault tolerance, ensures that the data is efficiently managed and transmitted throughout the system. The central repository functions as a hub, organizing incoming data and facilitating easy access for subsequent processing stages. This step is crucial for maintaining an organized data flow and ensuring that both raw and sanitized data are systematically stored.

In step 206, the system triggers a search request to the hard drive. This search request is a vital step where the system initiates the retrieval of specific data required for further processing. The search mechanism ensures that only the relevant records are identified and fetched, setting the stage for accurate and focused data handling.

Step 208 introduces the involvement of Artificial Intelligence (AI)/Machine Learning (ML) into the process. The ML model provides an intelligent search capability, significantly enhancing the system's ability to locate and identify sensitive data accurately. This intelligent search leverages advanced ML algorithms that have been extensively trained on large datasets to recognize patterns, classify data, and predict which records contain sensitive information. The ML model's continuous learning ability ensures that it improves over time, becoming more accurate and efficient as it processes more data.

Following the intelligent search, step 210 involves picking the identified data from the hard drive. This retrieval process is meticulously designed to ensure that only the necessary and relevant data is prepared for the next stages of processing. The system then proceeds to step 212, where the retrieved data is displayed in the output. This visual representation allows operators to review and verify the identified records, providing a layer of human oversight and quality control.

In step 214, the PCM algorithm is executed. PCM technology is pivotal in this system due to its unique ability to switch between two physical states-amorphous (Logical 0) and crystalline (Logical 1). Logical 0, characterized by high resistance and low conductivity, is ideal for processing smaller data volumes. Conversely, Logical 1, with low resistance and high conductivity, is suited for handling larger data volumes. This dynamic switching capability allows the system to optimize resource usage and processing speed based on the volume of data being handled.

Step 216 is where the data is processed if it involves more accounts. This step is designed to manage high-volume datasets efficiently, ensuring that the system can handle large amounts of data without compromising on speed or accuracy. In contrast, step 218 processes data with fewer accounts. This step optimizes the system's performance for smaller datasets, ensuring that even low-volume data is processed efficiently.

In step 220, the system creates fabricated data as per user requests. Data fabrication, or sanitization, transforms sensitive information into a non-sensitive format, protecting personal data from unauthorized access. This step is crucial for maintaining data privacy while ensuring that the data remains useful for analysis and other processing tasks.

Step 222 allows users to instantly generate the necessary steps for data processing. This functionality provides flexibility and control, enabling operators to customize the data handling process according to specific needs and requirements. This user-driven approach ensures that the system can adapt to various scenarios and data processing demands.

In step 224, the system updates the data without deleting existing records. PCM's capability to overwrite data directly without the need for traditional erasure processes significantly reduces processing time and enhances system efficiency. This feature ensures that updates can be made swiftly without compromising data integrity.

After processing, the sanitized data is sent back to the hard drive in step 226. This step ensures that the processed data is securely stored for future use, maintaining an organized and accessible data repository. Step 228 involves storing the processed data within the system's memory unit, providing a reliable and efficient storage solution.

Finally, in step 230, the processed data is displayed in the output, providing a final verification step. This step ensures that the data has been correctly sanitized and is ready for use. The visual confirmation allows for final checks and validations, ensuring that the system operates accurately and effectively.

Throughout this process, the system leverages the strengths of AI/ML and PCM technologies to create a robust, efficient, and secure data sanitization solution. The AI/ML model continuously learns and improves, enhancing its accuracy in identifying sensitive information. PCM's dynamic state switching and in-memory processing capabilities address the inefficiencies and risks associated with traditional data sanitization methods. By integrating these technologies, the system ensures that sensitive data is protected while optimizing resource usage and processing speed, providing a significant advancement over prior art methods. This comprehensive and detailed process flow highlights the sophisticated nature of the system and its ability to handle complex data sanitization tasks efficiently and securely.

Figure 3:
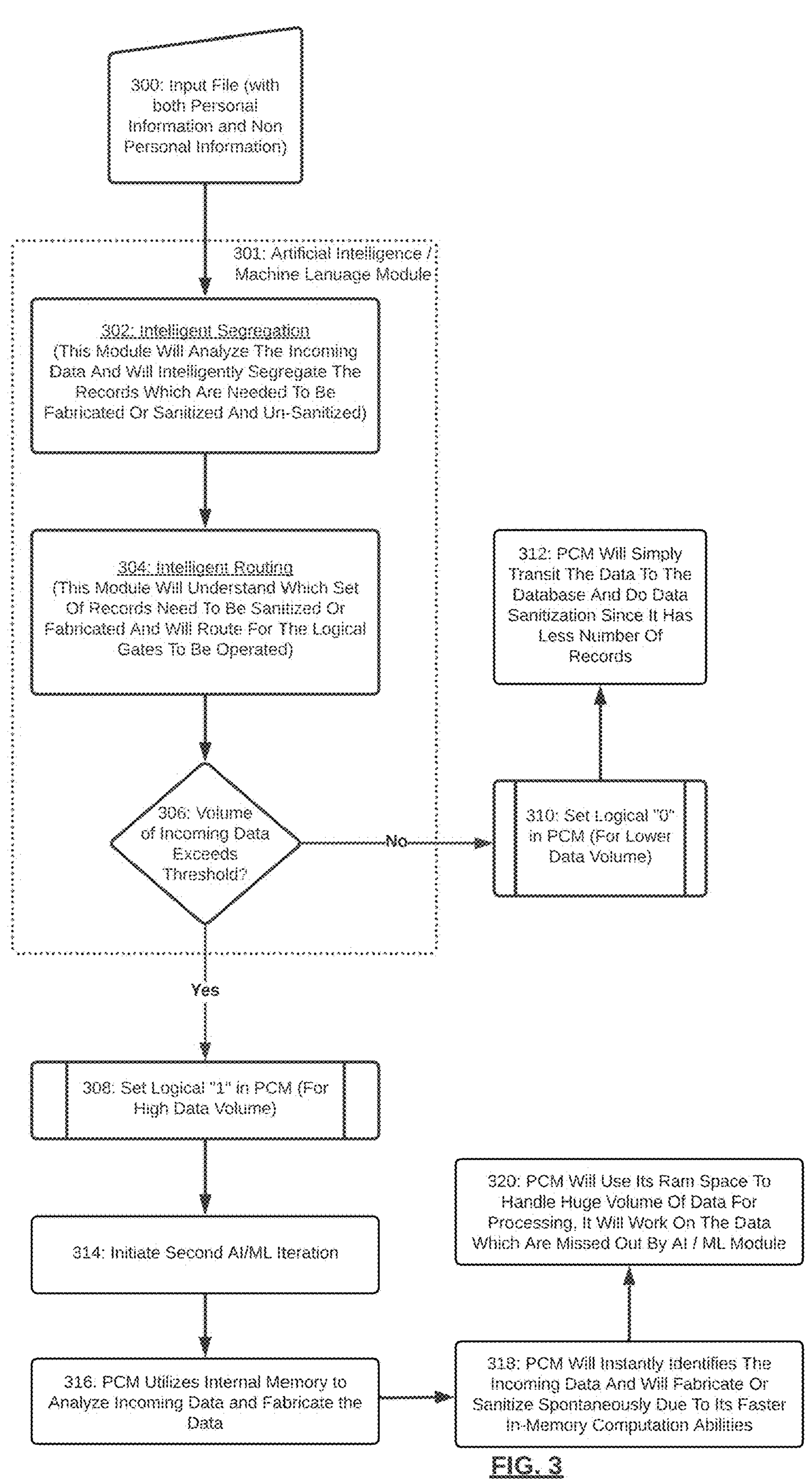
FIG. 3 elaborates on the segregation and routing of data based on volume. The AI/ML module intelligently segregates the data, determining whether it needs to be sanitized and routing it accordingly. If the volume of incoming data exceeds a threshold, the system sets PCM to Logical 1. If not, it sets PCM to Logical 0. This ensures that the system efficiently handles varying data volumes.

The diagram labeled as FIG. 3 presents a detailed flow of how the system intelligently segregates and routes data for sanitization using Phase Change Memory (PCM) and Artificial Intelligence/Machine Learning (AI/ML) technologies. This comprehensive depiction showcases the intricate steps involved in processing incoming data, identifying sensitive information, and ensuring its protection through an advanced sanitization process.

The process initiates with an input file that contains both personal information (PI) and non-personal information (NPI) as indicated in step 300. This input file is critical as it comprises a mix of sensitive attributes such as names, addresses, Social Security numbers, and financial information, along with general, non-sensitive data. The initial reception of this mixed dataset is crucial as it sets the stage for the intelligent segregation that follows.

In step 302, the system performs intelligent segregation of the incoming data. This module meticulously analyzes the incoming data to separate records that need sanitization from those that do not. Utilizing the AI/ML model, which has been rigorously trained to recognize sensitive information, this segregation is achieved efficiently. The AI/ML algorithms delve into the dataset, identifying patterns and attributes that signify personal information requiring protection. This targeted approach ensures that only the necessary data undergoes sanitization, thereby optimizing the processing load and resource utilization.

Following segregation, the system moves to step 304, which involves intelligent routing. This module comprehends which set of records require sanitization or fabrication and directs them to the appropriate logical gates for processing. The intelligent routing capability, powered by the AI/ML model, dynamically assesses data characteristics and routes them efficiently, ensuring that records needing sanitization are accurately directed for further processing.

The next crucial step, 306, involves evaluating whether the volume of incoming data exceeds a predefined threshold. This assessment determines how the data will be processed within the PCM. If the data volume is high, the system sets Logical 1 in PCM as depicted in step 308. Logical 1 represents the crystalline state in PCM, characterized by low resistance and high conductivity, making it suitable for handling large volumes of data with efficiency. This dynamic switching to Logical 1 allows the system to manage high-volume datasets without compromising on processing speed or accuracy.

For datasets where the volume does not exceed the threshold, the system sets Logical 0 in PCM, as shown in step 310. Logical 0 corresponds to the amorphous state, characterized by high resistance and low conductivity, ideal for processing smaller volumes of data. By dynamically switching between Logical 0 and Logical 1 based on the volume of incoming data, the system ensures optimal resource utilization and processing efficiency.

In scenarios where the data volume is lower, step 312 involves the PCM simply transiting the data to the database while performing data sanitization. This step underscores the capability of PCM to handle in-memory processing, ensuring that data is sanitized efficiently within the memory unit itself. The AI/ML module continues to iterate and refine its analysis in step 314, initiating a second iteration if necessary.

This iterative process enables continuous improvement in accuracy for identifying and sanitizing sensitive data.

Step 316 highlights PCM's utilization of its internal memory to analyze incoming data and fabricate it accordingly. The in-memory computing capabilities of PCM allow it to process data directly within the memory unit, reducing the need for extensive data transfers and significantly enhancing processing speed. This ability ensures that data sanitization is performed quickly and accurately, maintaining data integrity throughout the process.

PCM's instantaneous identification and fabrication or sanitization of incoming data are highlighted in step 318. Due to its rapid in-memory computation abilities, PCM processes new data inputs promptly and effectively, providing real-time data protection. Additionally, PCM uses its RAM space to manage large volumes of data, as shown in step 320. This ensures that even high-volume datasets are processed efficiently, further enhancing the system's overall performance.

The AI/ML module's role in categorizing and segregating data is further emphasized. It identifies specific data that needs to be sanitized and separates it from data that does not require sanitization. This intelligent categorization ensures that only the necessary records are processed, optimizing the system's performance and resource utilization. By understanding the volume of records, the AI/ML module can invoke Logical 1 for handling larger volumes of data and Logical 0 for smaller volumes. This dynamic handling ensures that the system can scale efficiently based on the data load, maintaining high performance and accuracy.

Once the records are within PCM, they undergo a quick re-check against existing data in the memory to ensure they have not been previously sanitized. This real-time validation, depicted in step 320, prevents redundant processing and ensures data integrity. PCM handles the sanitization techniques within its memory blocks, performing real-time data processing. Once sanitized, the data is sent to the hard drive or database for storage. This immediate update capability ensures that the most current data is always available, enhancing the system's reliability and effectiveness.

This system's design allows for a central repository to be optional, if desired, which is often a single point of failure and a security risk in traditional systems. By leveraging AI/ML and PCM technologies, the system offers a decentralized approach, reducing these risks and enhancing overall system security and robustness. The integration of AI/ML with PCM not only enhances data security but also significantly improves system efficiency. The AI/ML module's ability to learn and adapt allows it to identify and respond to new data patterns and security threats in real time. The in-memory processing capabilities of PCM ensure fast and efficient data handling, making this system a significant advancement over traditional data sanitization methods. This innovative approach addresses the limitations of existing methods, providing a more secure, efficient, and reliable solution for managing sensitive data.

Figure 4:
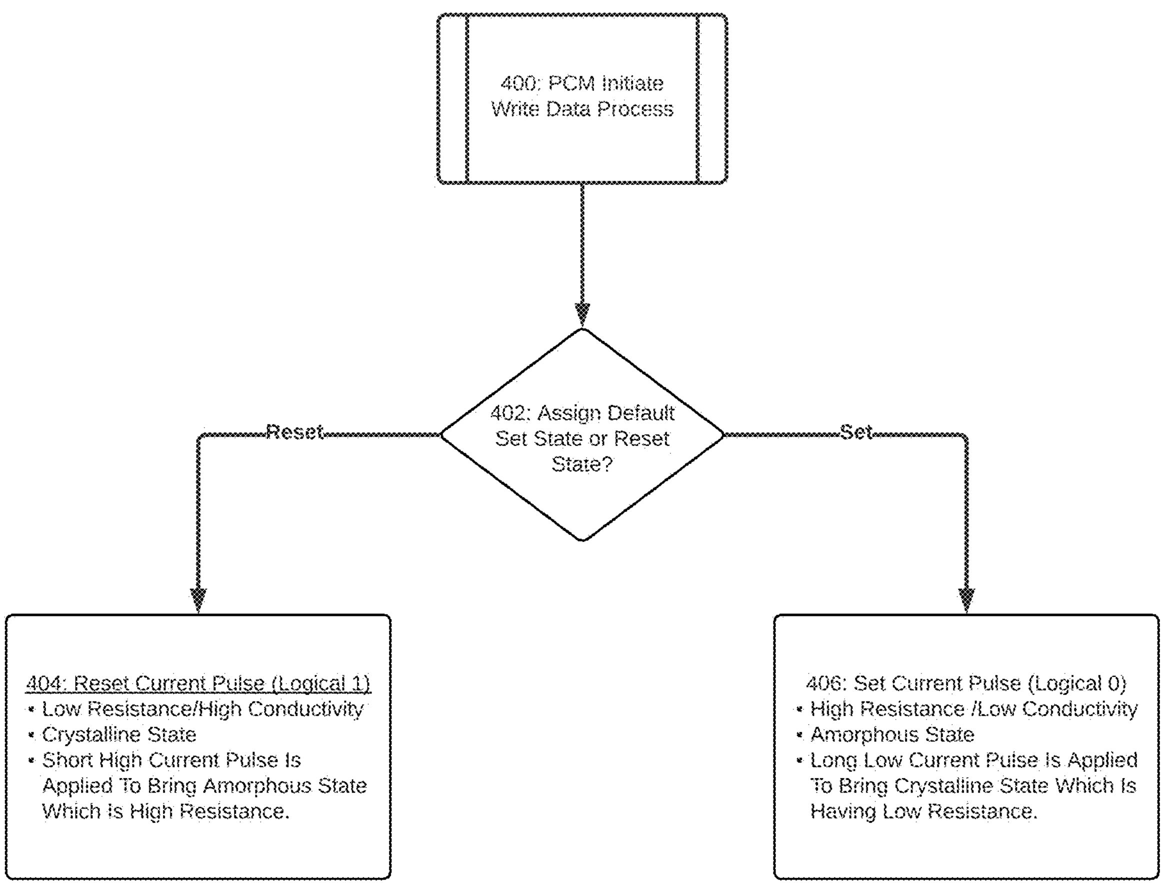
FIG. 4 illustrates the mechanism of PCM's state transitions in the invention. The PCM module initiates the write data process, determining whether to set the current level to Logical 0 or Logical 1 based on the data volume. The reset current level (Logical 1) brings the memory to a low resistance, high conductivity crystalline state, while the set current level (Logical 0) brings it to a high resistance, low conductivity amorphous state. These transitions allow the PCM to process data efficiently based on its volume.

FIG. 4 provides an intricate and detailed process flow of how data is handled using Phase Change Memory (PCM) technology, with an emphasis on the transition between different states and the mechanisms that facilitate efficient and secure data processing. This diagram highlights the core functionality of PCM, which is central to the intelligent data sanitization system, showcasing the steps involved in writing, processing, and storing data within the memory unit.

The process commences with PCM initiating the write data process, as indicated in step 400. This initiation phase is fundamental, preparing the system to handle incoming data by setting up the necessary conditions for efficient data processing. PCM, known for its non-volatile properties, retains data even when power is switched off, making it ideal for applications requiring reliable long-term data storage. This initiation step forms the foundation for the subsequent data processing steps.

In step 402, the system must decide whether to assign a default set state or reset state to the PCM. This decision is crucial as it determines the physical configuration of the PCM and, consequently, how the data will be processed and stored within the memory. The default set state and reset state correspond to different electrical properties of the PCM, each optimized for specific data handling scenarios.

When the system opts for the reset state (step 404), it applies a short, high current level to the PCM. This action transitions the memory to a low resistance, high conductivity crystalline state, represented by Logical 1. The crystalline state is advantageous for processing large volumes of data due to its high conductivity, allowing for faster data transactions. In this state, PCM can efficiently handle significant amounts of data, making it ideal for high-volume data processing tasks, such as bulk data sanitization operations. The system's ability to switch to the crystalline state on demand allows it to maintain high performance even under heavy data loads.

Conversely, when the system chooses the set state (step 406), it applies a long, low current level to bring the PCM to a high resistance, low conductivity amorphous state, represented by Logical 0. The amorphous state is suitable for handling smaller volumes of data, as the high resistance and low conductivity limit the speed and volume of data transactions. This state ensures that the system can process small data sets with precision, without overloading the memory unit. By dynamically switching between the set and reset states based on the data volume, the system optimizes resource usage and processing speed.

The transitions between the set and reset states are fundamental to the operation of PCM. This dynamic switching capability is a core inventive feature of the system, enabling it to handle varying data loads efficiently. The ability to switch between Logical 0 and Logical 1 based on data volume ensures that the system can process both large and small data sets with optimal efficiency.

As the PCM processes data in the reset state (Logical 1), it utilizes the crystalline state's low resistance to facilitate rapid data transactions. This state is particularly useful for scenarios requiring the processing of large datasets quickly, such as during bulk data sanitization operations. The low resistance allows for fast data read and write operations, ensuring that large volumes of data are processed in a timely manner. The system's capability to switch to the crystalline state as needed is a significant advantage, allowing it to handle high data loads without sacrificing performance.

In the set state (Logical 0), the PCM's high resistance and low conductivity slow down data transactions, making it ideal for precise and controlled data processing. This state is beneficial for handling small datasets or performing detailed data sanitization tasks that require careful attention to individual data points. By switching to the amorphous state as needed, the system ensures that small data sets are processed accurately and efficiently, maintaining high data integrity.

The intelligent integration of AI/ML technology with PCM further enhances the system's capabilities. The AI/ML module continuously monitors data volume and characteristics, dynamically adjusting the PCM's state to optimize processing. This intelligent oversight ensures that the system can adapt to changing data patterns and volumes, maintaining efficiency and accuracy in all scenarios. The AI/ML module's learning and adaptive abilities are crucial for the system's performance. By analyzing historical data and recognizing patterns, the AI/ML module can predict future data trends and adjust the PCM's state proactively. This predictive capability minimizes latency and maximizes processing speed, ensuring that the system remains responsive and efficient over time.

The non-volatile nature of PCM plays a vital role in ensuring data integrity and reliability. Unlike traditional volatile memory systems that lose data when power is switched off, PCM retains data consistently, providing a stable and dependable storage solution. This characteristic is particularly important for applications requiring long-term data retention and reliability, such as secure data sanitization. The discussions highlighted the system's in-memory processing ability, a significant advantage of PCM technology. By processing data directly within the memory unit, the system eliminates the need for data transfers between separate processing and storage units, reducing latency and improving efficiency. This in-memory processing capability offers faster and more streamlined data transactions compared to traditional data handling methods.

The system's design also allows for direct data overwriting, bypassing the traditional requirement for data erasure before writing new data. This direct overwrite capability significantly reduces processing time and resource usage, enhancing the system's overall performance. By enabling immediate data updates without the need for erasure, the system ensures that data is processed and stored quickly and efficiently.

With respect to the intelligent routing capabilities of the AI/ML module, it assesses incoming data and directs it to the appropriate state of PCM for optimal processing. For instance, if a large dataset is detected, the AI/ML module directs the PCM to switch to Logical 1, ensuring efficient handling of high volumes. Conversely, for smaller datasets, the module switches the PCM to Logical 0, optimizing the processing for precision and control.

Additionally, the AI/ML module's role in categorizing and segregating data is crucial. It identifies specific data that needs to be sanitized and separates it from data that does not require sanitization. This intelligent categorization ensures that only the necessary records are processed, optimizing the system's performance and resource utilization. The AI/ML module can dynamically invoke Logical 1 for handling larger volumes of data and Logical 0 for smaller volumes, ensuring efficient scaling based on the data load.

Throughout the process, the system continuously rechecks records against existing data in the memory to ensure they have not been previously sanitized. This real-time validation prevents redundant processing and ensures data integrity. The PCM handles the sanitization techniques within its memory blocks, performing real-time data processing. Once sanitized, the data is sent to the hard drive or database for storage, ensuring that the most current data is always available. This immediate update capability enhances the system's reliability and effectiveness.

By leveraging AI/ML and PCM technologies, the system eliminates the need for a central repository, often a single point of failure and a security risk in traditional systems. This decentralized approach reduces these risks, enhancing overall system security and robustness. The integration of AI/ML with PCM significantly improves system efficiency and data security. The AI/ML module's learning and adaptive abilities allow it to identify and respond to new data patterns and security threats in real time. The in-memory processing capabilities of PCM ensure fast and efficient data handling, making this system a significant advancement over traditional data sanitization methods.

In conclusion, FIG. 4 provides a detailed depiction of the sophisticated mechanisms enabling PCM to process data efficiently and securely. The dynamic switching between Logical 0 and Logical 1 states, guided by the AI/ML module, ensures that the system can handle varying data volumes with precision and speed. The non-volatile nature of PCM guarantees data integrity and reliability, while in-memory processing and direct data overwriting enhance efficiency. This advanced integration of AI/ML and PCM technologies offers a robust and responsive solution for data sanitization, addressing the limitations of traditional methods and providing significant improvements in performance and security.

Figure 5:
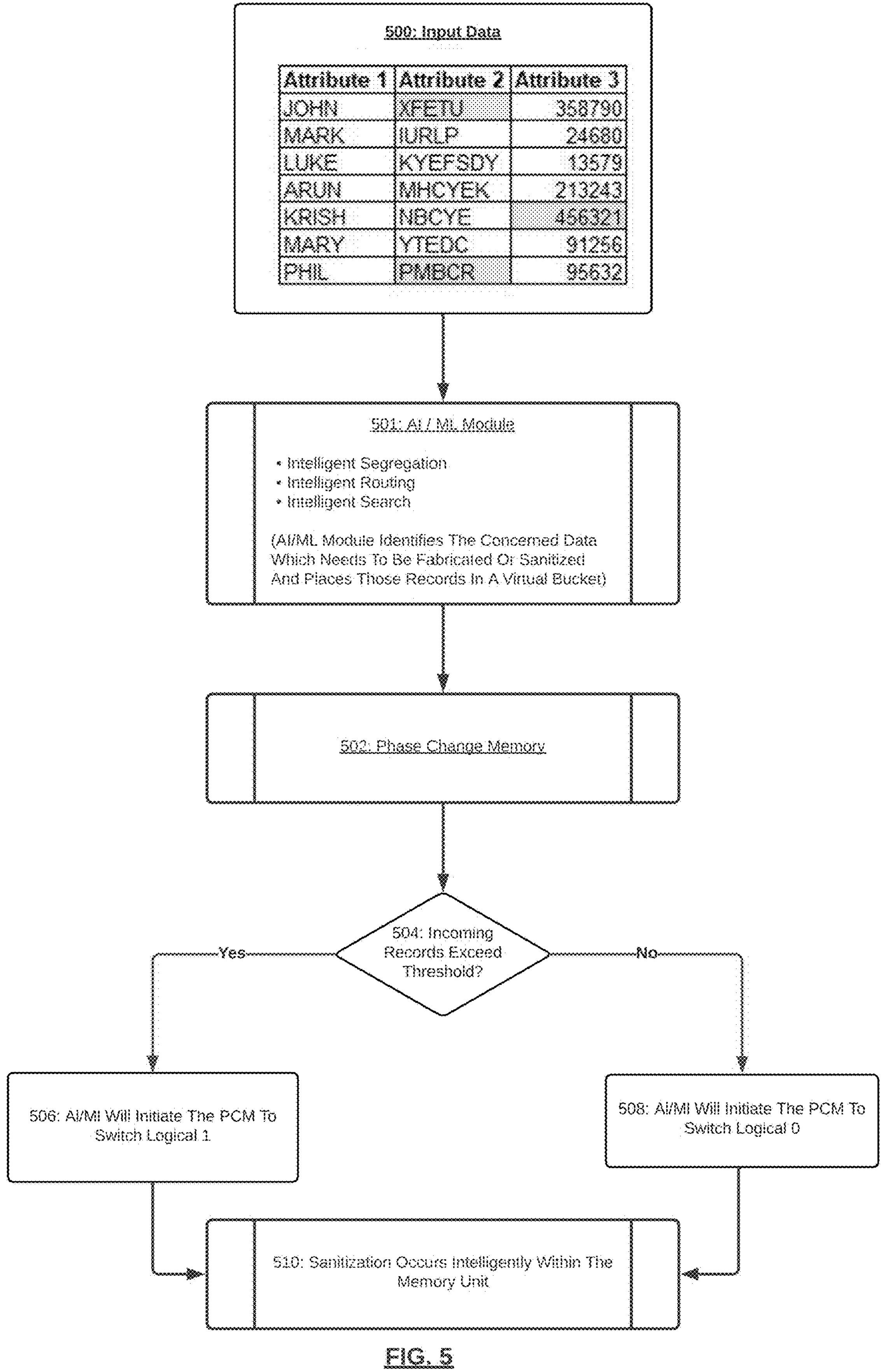
FIG. 5 combines the AI/ML module and PCM to handle data sanitization intelligently within the memory unit. The AI/ML module identifies the data that needs to be sanitized and places those records in a virtual bucket. The PCM then processes these records based on their volume, using Logical 1 for large volumes and Logical 0 for smaller volumes.

FIG. 5 illustrates the sophisticated integration of Artificial Intelligence/Machine Learning (AI/ML) and Phase Change Memory (PCM) technologies to achieve efficient and secure data sanitization. This detailed diagram elucidates how the system processes incoming data, identifies sensitive information, and routes it for sanitization, ensuring optimal performance and security at every step.

The process begins with the ingestion of an input file that includes both personal information (PI) and non-personal information (NPI). This input file contains a mix of sensitive attributes such as names, addresses, Social Security numbers, and financial information alongside non-sensitive data. This initial step is critical as it establishes the foundation for the intelligent segregation and processing that the system will perform.

Upon receiving the data, the AI/ML module is activated to analyze the incoming dataset. This module is trained to identify which specific records require sanitization. Unlike traditional methods that might sanitize entire attributes, the AI/ML module targets only the necessary data within each attribute. By recognizing patterns and characteristics that signify personal information, the module intelligently separates sensitive records from non-sensitive ones. This targeted approach minimizes the computational load and optimizes resource utilization.

Once the sensitive data is identified, the AI/ML module categorizes and routes it to the appropriate processing path. This intelligent routing ensures that data requiring sanitization is directed to the PCM for further handling. The routing decision is based on the volume and characteristics of the data, ensuring that the system can dynamically adjust to varying data loads. The AI/ML module continuously learns from the data, improving its accuracy and efficiency over time. This continuous learning process allows the system to adapt to new data patterns and maintain high performance.

As the data moves through the system, it reaches the PCM, where a crucial assessment is made regarding the data volume. If the volume of incoming data exceeds a predefined threshold, the PCM is set to Logical 1, a crystalline state characterized by low resistance and high conductivity. This state is ideal for handling large volumes of data efficiently, allowing rapid data transactions. The low resistance facilitates fast read and write operations, making it suitable for high-volume data processing tasks such as bulk data sanitization.

Conversely, if the data volume is low, the PCM is set to Logical 0, an amorphous state with high resistance and low conductivity. This state is better suited for processing smaller volumes of data with precision. The high resistance and low conductivity ensure controlled and precise data handling, which is essential for detailed data sanitization tasks. By dynamically switching between Logical 0 and Logical 1 based on data volume, the system optimizes resource usage and processing speed, ensuring that it can handle both large and small datasets efficiently.

The PCM's ability to dynamically switch between these states is a core inventive feature of the system. This dynamic switching capability allows the system to adapt to varying data volumes and maintain optimal performance. For large datasets, the crystalline state (Logical 1) enables quick and efficient data processing, while for smaller datasets, the amorphous state (Logical 0) provides controlled and precise handling.

Once the data is in the appropriate state, the PCM processes it accordingly. If the data volume is high, the PCM leverages its crystalline state to ensure fast processing. The system takes full advantage of PCM's in-memory processing capabilities, processing data directly within the memory unit. This in-memory processing eliminates the need for data transfers between separate processing and storage units, reducing latency and enhancing efficiency. The ability to process data within the memory unit itself is a significant improvement over traditional data handling methods.

For smaller datasets, the PCM processes the data in its amorphous state, ensuring precise and controlled handling. This state is beneficial for tasks that require careful attention to individual data points, such as detailed data sanitization. By dynamically adjusting to the volume and characteristics of the data, the system maintains high performance and accuracy.

Throughout the data processing phase, the PCM performs real-time checks to ensure data integrity. It verifies whether the data has been previously sanitized, preventing redundant processing. This real-time validation is critical for maintaining data accuracy and efficiency, ensuring that each record is processed correctly. The system's ability to re-check records against existing data in the memory ensures that redundant processing is avoided, enhancing overall system efficiency.

As the PCM processes data, it performs sanitization in real-time, transforming sensitive information into a non-sensitive format. This transformation ensures that personal data is protected from unauthorized access while retaining its utility for analysis and other processing tasks. The sanitized data is then stored within the PCM, leveraging its non-volatile properties to ensure data retention and reliability. Unlike traditional volatile memory systems that lose data when power is switched off, PCM retains data consistently, providing a stable and dependable storage solution.

Once the data is sanitized and stored, the AI/ML module continues to monitor and adapt to changing data patterns. It learns from historical data, predicting future trends and adjusting the PCM's state proactively. This predictive capability minimizes latency and maximizes processing speed, ensuring that the system remains responsive and efficient over time. The continuous improvement cycle of the AI/ML module ensures that the system remains effective in identifying and sanitizing sensitive data.

The AI/ML module's role in intelligent routing and categorization further enhances the system's capabilities. It categorizes incoming records, identifying specific data that needs sanitization and separating it from data that does not require sanitization. This intelligent categorization ensures that only the necessary records are processed, optimizing the system's performance and resource utilization. The AI/ML module can dynamically invoke Logical 1 for handling larger volumes of data and Logical 0 for smaller volumes, ensuring efficient scaling based on the data load.

The system's design allows for direct data overwriting, bypassing the traditional requirement for data erasure before writing new data. This direct overwrite capability significantly reduces processing time and resource usage, enhancing the system's overall performance. By enabling immediate data updates without the need for erasure, the system ensures that data is processed and stored quickly and efficiently.

Once the records are processed and sanitized, they are stored within the PCM. The system ensures that the sanitized data is securely stored in the memory unit, providing reliable and efficient storage. This storage solution leverages PCM's non-volatile properties, ensuring data retention and reliability even when the system is powered down.

Finally, the processed and sanitized data is displayed in the output, providing a final verification step. This visual confirmation allows operators to review and validate the sanitized data, ensuring that it meets the required standards of accuracy and integrity. This final step ensures that the data is correctly sanitized and ready for use, enhancing the system's reliability and effectiveness.

Throughout this comprehensive process, the integration of AI/ML and PCM technologies ensures that sensitive data is protected while optimizing resource usage and processing speed. The dynamic switching between Logical 0 and Logical 1 states, guided by the AI/ML module, ensures that the system can handle varying data volumes with precision and speed. The non-volatile nature of PCM guarantees data integrity and reliability, while in-memory processing and direct data overwriting enhance efficiency. This advanced system offers a robust and responsive solution for data sanitization, addressing the limitations of traditional methods and providing significant improvements in performance and security. The combination of AI/ML's continuous learning and adaptation with PCM's dynamic processing capabilities creates a powerful and effective system for managing and protecting sensitive data in modern data processing environments.

Figure 6:
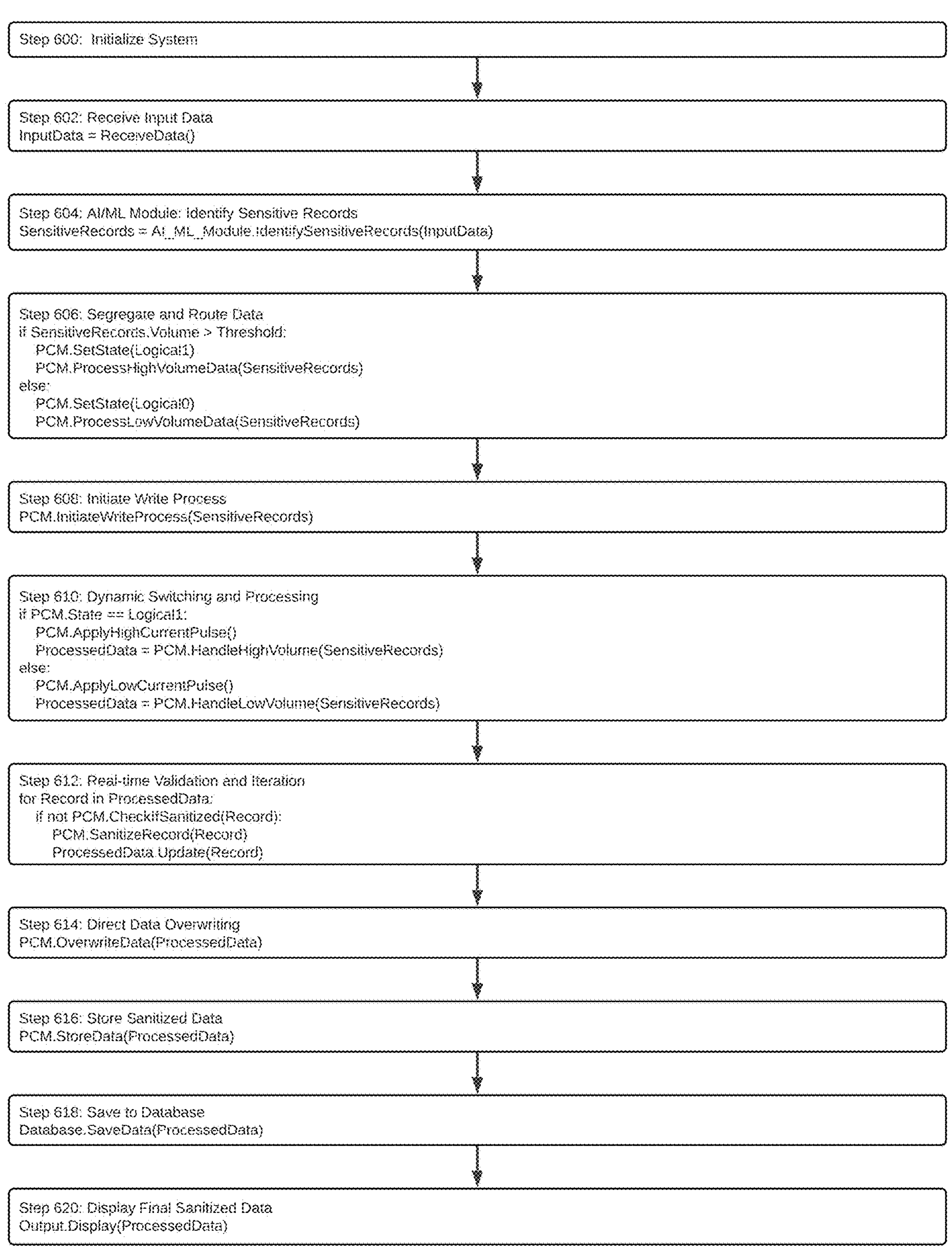
FIG. 6 illustrates sample pseudo code for an intelligent data sanitization process in accordance with one or more aspects of the invention, where the AI/ML module identifies and segregates sensitive records, which are then dynamically processed by Phase Change Memory (PCM) based on data volume. The system ensures efficient sanitization and secure storage of data through real-time validation, direct overwriting, and in-memory processing.

FIG. 6 illustrates pseudo code for the proposed invention. A detailed explanation for each step in the process flow of the intelligent data sanitization system is as follows.

Step 600: Initialize System—The initialization step sets up the system, preparing both the PCM (Phase Change Memory) and the AI/ML (Artificial Intelligence/Machine Learning) modules for data processing. This involves loading necessary software, calibrating hardware components, and ensuring that all modules are correctly configured. The initialization process ensures that the system is ready to handle incoming data efficiently and accurately.

Step 602: Receive Input Data—In this step, the system receives an input file containing a mixture of sensitive personal information (PI) and non-sensitive information (NPI). This input data may include attributes such as names, addresses, Social Security numbers, financial information, and other personal identifiers. The integrity and accuracy of this data are crucial as they form the basis for the subsequent processing and sanitization steps.

Step 604: AI/ML Module: Identify Sensitive Records—The AI/ML module analyzes the input data to identify records that contain sensitive information. The module is trained to recognize patterns and attributes that signify personal information. Using advanced machine learning algorithms, the system scans each record to determine whether it includes sensitive data that requires protection. This intelligent identification process ensures that only necessary data is flagged for sanitization, optimizing the overall efficiency of the system.

Step 606: Segregate and Route Data—Based on the volume of sensitive data identified, the system segregates and routes the data accordingly. If the volume of sensitive records exceeds a predefined threshold, the PCM is set to Logical 1, indicating a high-volume processing mode. Conversely, if the volume is below the threshold, the PCM is set to Logical 0, indicating a low-volume processing mode. This dynamic routing ensures that the system can handle varying data loads efficiently, using the appropriate state of PCM for optimal performance.

Step 608: Initiate Write Process—Once the data is segregated and routed, PCM initiates the write process for the identified sensitive records. This step involves setting up the memory unit to receive and process the data, ensuring that all necessary conditions for data handling are met. The initiation of the write process prepares the system for the subsequent dynamic switching and processing of data.

Step 610: Dynamic Switching and Processing—PCM dynamically switches between its crystalline state (Logical 1) and amorphous state (Logical 0) based on the volume of data. For high-volume data, PCM applies a high current level to set the memory to the crystalline state, characterized by low resistance and high conductivity. This state facilitates rapid data transactions, allowing the system to handle large datasets efficiently. For low-volume data, PCM applies a low current level to set the memory to the amorphous state, characterized by high resistance and low conductivity, which is ideal for precise and controlled data processing.

Step 612: Real-time Validation and Iteration—During this step, the system performs real-time checks to ensure that the data has not been previously sanitized. This involves iterating through each record in the processed data to validate its sanitization status. If a record is found to be unsanitized, the PCM module sanitizes it and updates the processed data accordingly. This real-time validation prevents redundant processing and ensures data integrity and accuracy.

Step 614: Direct Data Overwriting—PCM directly overwrites existing data with the new sanitized data. Unlike traditional memory systems that require data to be erased before writing new data, PCM allows for direct overwriting, significantly reducing processing time and resource usage. This capability enhances the system's overall efficiency, ensuring that data is processed and stored quickly.

Step 616: Store Sanitized Data—The sanitized data is securely stored in PCM's non-volatile memory. PCM retains data even when the power is switched off, providing a reliable long-term storage solution. This step ensures that the sanitized data is preserved and can be accessed in the future without the risk of data loss.

Step 618: Save to Database—After the data is sanitized and stored in PCM, it is saved to a database or storage unit. This involves transferring the processed data from PCM to a secure database, where it can be accessed for future use. The database serves as a central repository for the sanitized data, ensuring that it is organized and readily available for authorized users.

Step 620: Display Final Sanitized Data—Finally, the processed and sanitized data is displayed for verification. This step allows operators to review the sanitized data, ensuring that it meets the required standards of accuracy and integrity. The visual confirmation provided in this step is crucial for validating the effectiveness of the sanitization process and ensuring that the data is ready for use.

By way of further detailed explanation, it should be understood that the initialization step (Step 600) is crucial for ensuring that the system is correctly configured and ready to process incoming data. This involves setting up both hardware and software components, ensuring that the PCM and AI/ML modules are calibrated and functioning as intended. The initialization process includes loading the necessary machine learning models, configuring memory settings, and preparing the system to handle data efficiently.

When the system receives input data (Step 602), it must handle a variety of data types and formats. The input file may include structured data, such as database records, as well as unstructured data, such as text documents. The system must parse and interpret this data, extracting relevant information for further processing. The integrity and accuracy of the input data are paramount, as any errors at this stage can propagate through the entire process.

The AI/ML module's task of identifying sensitive records (Step 604) involves sophisticated algorithms trained on large datasets to recognize patterns indicative of personal information. This module must be capable of distinguishing between sensitive and non-sensitive data with high accuracy, reducing false positives and ensuring that only truly sensitive data is flagged for sanitization. This process involves analyzing each record, assessing its attributes, and determining whether it contains personal information that needs protection.

Segregating and routing data based on its volume (Step 606) is a dynamic process that requires real-time analysis and decision-making. The system must evaluate the volume of sensitive data and determine the appropriate state for PCM. If the volume exceeds a predefined threshold, the system switches to a high-volume processing mode (Logical 1), optimizing the memory settings to handle large datasets efficiently. Conversely, for smaller datasets, the system switches to a low-volume processing mode (Logical 0), ensuring precise and controlled data handling.

Initiating the write process (Step 608) involves preparing the PCM to receive and process the identified sensitive records. This step includes configuring the memory unit, setting up data paths, and ensuring that all necessary conditions for data processing are met. The initiation process is crucial for setting the stage for dynamic switching and processing, allowing the system to handle data efficiently.

Dynamic switching and processing (Step 610) are key features of PCM technology. The ability to switch between the crystalline state (Logical 1) and amorphous state (Logical 0) based on data volume allows the system to optimize resource usage and processing speed. For high-volume data, the low resistance and high conductivity of the crystalline state facilitate rapid data transactions, ensuring that large datasets are processed quickly. For low-volume data, the high resistance and low conductivity of the amorphous state provide precise and controlled data handling, essential for detailed data sanitization tasks.

Real-time validation and iteration (Step 612) ensure that data integrity is maintained throughout the process. The system continuously checks each record to verify its sanitization status, iterating as necessary to ensure that all sensitive data is properly sanitized. This step involves sophisticated algorithms that assess the sanitization status of each record, updating the processed data as needed. The real-time validation process prevents redundant processing, enhancing overall efficiency and accuracy.

Direct data overwriting (Step 614) is a significant advantage of PCM technology. Traditional memory systems require data to be erased before new data can be written, a process that is time-consuming and resource intensive. PCM's ability to overwrite existing data directly reduces processing time and enhances efficiency, allowing the system to update data quickly and effectively.

Storing sanitized data in PCM's non-volatile memory (Step 616) ensures long-term data retention and reliability. Non-volatile memory retains data even when the power is switched off, providing a stable and dependable storage solution. This step ensures that the sanitized data is preserved and can be accessed in the future without the risk of data loss.

Saving the sanitized data to a database (Step 618) involves transferring the processed data from PCM to a secure database. This step ensures that the data is organized and readily available for authorized users. The database serves as a central repository, providing a structured environment for storing and accessing sanitized data.

Finally, displaying the sanitized data (Step 620) allows operators to review and verify the processed information. This step provides a visual confirmation that the data has been correctly sanitized and meets the required standards of accuracy and integrity. The verification process is crucial for ensuring that the data is ready for use, providing confidence in the effectiveness of the sanitization process.

This expanded explanation provides a comprehensive overview of the intelligent data sanitization system, highlighting the roles of AI/ML and PCM technologies in optimizing the process and ensuring data integrity and security.

Figure 7:
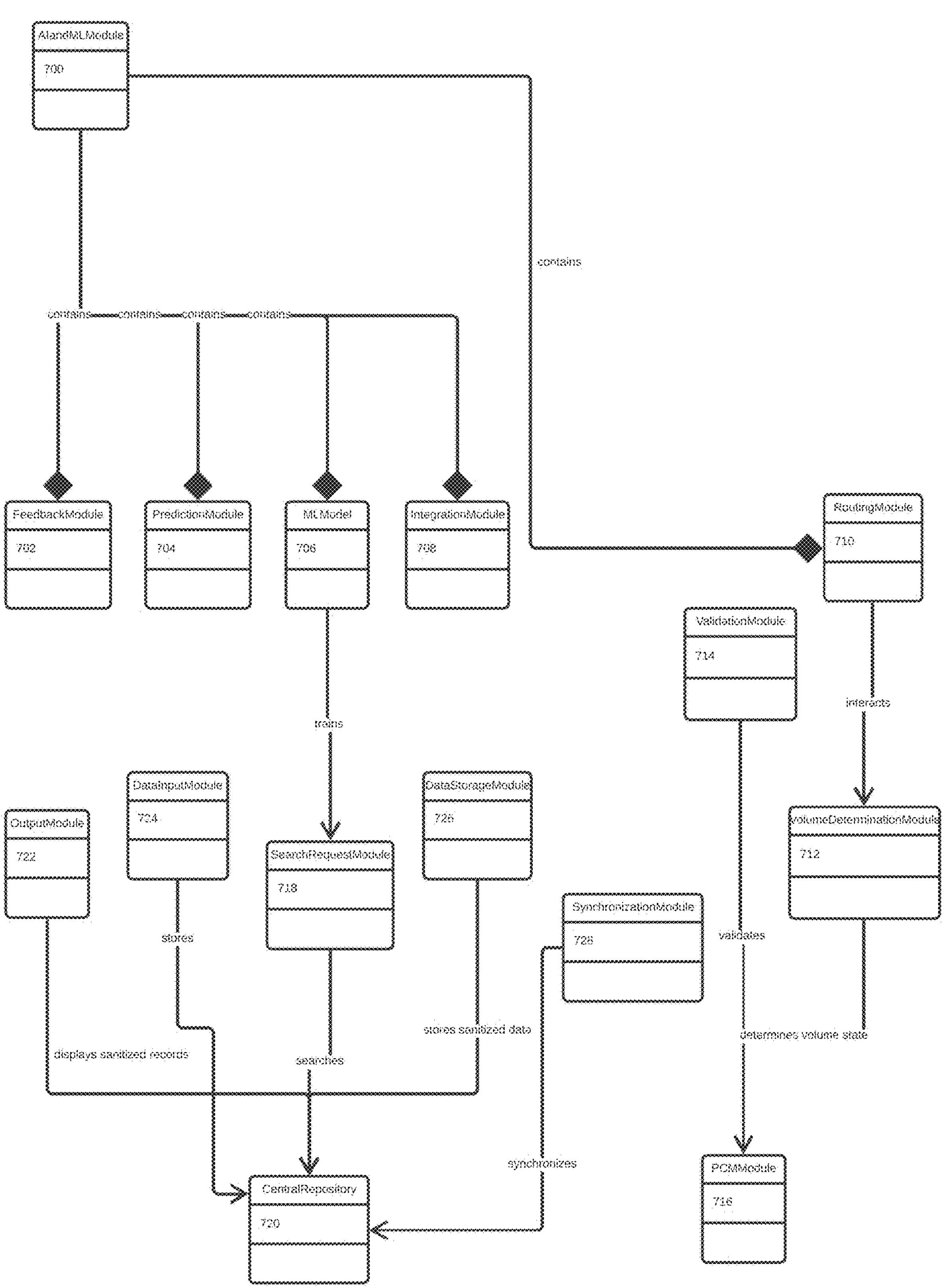
FIG. 7 illustrates a sample class diagram for a system for intelligent fabrication of secured data through smart Phase Change Memory (PCM) computing in accordance with one or more aspects of the invention. The diagram shows interconnected modules including a Data Input Module, Central Repository, Search Request Module, Machine Learning (ML) Model, Artificial Intelligence (AI) and ML Module, Routing Module, Volume Determination Module, PCM Module, Validation Module, Prediction Module, Feedback Module, Integration Module, Data Storage Module, Synchronization Module, and Output Module, each playing a specific role in processing and securing data.

The class diagram of FIG. 7 for the system of intelligent fabrication of secured data through smart Phase Change Memory (PCM) computing comprises multiple interconnected modules, each responsible for specific functions within the system. The Data Input Module (Class 700) is responsible for receiving the input file that contains both personal and non-personal information data, wherein the personal information includes sensitive attributes such as names, addresses, Social Security numbers, and financial information, and the non-personal information includes general, non-sensitive data. Sample functions for this module include 'receiveInputFile( )', which receives the input file, and 'parseData( )', which parses the input file and categorizes data into personal and non-personal information. The system includes a Central Repository (Class 702) for organizing and storing the incoming data for efficient access and processing. Sample functions include 'storeData( )', which stores parsed data, and 'retrieveData( )', which retrieves data for processing.

A Search Request Module (Class 704) triggers search requests to identify sensitive data within the Central Repository, utilizing metadata indexing and search algorithms to locate records containing personal information. Sample functions include 'triggerSearch( )', which initiates a search request, and 'identifySensitiveData( )', which utilizes metadata indexing and search algorithms to locate sensitive records. The system employs a Machine Learning (ML) Model (Class 706) trained on labeled datasets of sensitive and non-sensitive data to perform intelligent searches to identify records containing sensitive information in the Central Repository. Sample functions for this module include 'trainModel( )', which trains the ML model with new datasets, and 'performSearch( )', which executes the search for sensitive data using the trained model.

An Artificial Intelligence (AI) and ML Module (Class 708) is configured to segregate the records containing sensitive information by analyzing the identified records to separate sensitive data from non-sensitive data. Sample functions include 'segregateData( )', which separates sensitive data from non-sensitive data, and 'analyzeRecords( )', which performs detailed analysis on identified records. The system includes a Routing Module (Class 710) configured to route the segregated sensitive records based on their data volume, determining the appropriate processing path for each record based on its data volume. Sample functions include 'routeData( )', which determines and executes the appropriate processing path for each record, and 'determinePath( )', which determines routing based on data volume. A Volume Determination Module (Class 712) determines if the volume of data exceeds a predefined threshold, which is set to differentiate between high-volume and low-volume data processing requirements. Sample functions include 'determineVolume( )', which assesses the volume of data, and 'setThreshold( )', which defines and adjusts volume thresholds.

The PCM Module (Class 714) is configured to manage data processing within the PCM based on volume determination. This module sets the PCM to a logical '1' state for high data volume, characterized by low resistance and high conductivity, if the volume exceeds the predefined threshold, to facilitate rapid data transactions and high throughput. It also sets the PCM to a logical '0' state for low data volume, characterized by high resistance and low conductivity, if the volume does not exceed the predefined threshold, to ensure precise data handling with controlled resistance levels suitable for smaller datasets. Sample functions include 'setLogicalState( )', which sets PCM to logical '1' or '0' state, 'processData( )', which processes data within PCM, 'switchPCMState( )', which dynamically switches PCM states based on data volume, 'sanitizeData( )', which performs in-memory processing for data sanitization, 'overwriteData( )', which overwrites existing data directly in PCM, 'trackSanitizedRecords( )', which keeps track of sanitized records, and 'performComputations( )', which handles in-memory computations.

A Validation Module (Class 716) validates in real-time whether the segregated sensitive records have been sanitized using validation algorithms to ensure data integrity and prevent redundant processing. Sample functions include 'validateRecords( )', which checks the integrity of sanitized records, and 'realTimeValidation( )', which performs real-time validation. The PCM's internal memory keeps track of which records have been sanitized, preventing redundant processing and ensuring that each record is only processed once. In-memory computations are performed within the PCM to handle data transformations and sanitization, reducing the need for data transfers between processing and storage units, thereby minimizing latency and enhancing overall processing speed.

The system includes a Prediction Module (Class 718) within the AI/ML Module configured to predict future data patterns based on historical data, enabling the system to preemptively allocate resources and adjust its processing strategies to improve responsiveness and efficiency in handling fluctuating data volumes. Sample functions include 'predictDataPatterns( )', which forecasts data trends, and 'allocateResources( )', which preemptively allocates system resources. A Feedback Module (Class 720) within the AI/ML Module incorporates feedback to dynamically adjust PCM processing parameters, ensuring that the system remains adaptive and responsive to changing data characteristics and processing requirements. Sample functions include 'adjustProcessingParameters( )', which modifies PCM parameters based on feedback, and 'integrateFeedback( )', which applies real-time adjustments. An Integration Module (Class 722) within the AI/ML Module integrates security protocols to detect and respond to potential data breaches or anomalies in real-time, ensuring that sensitive data is protected throughout the processing cycle and enhancing the overall security of the system. Sample functions include 'detectBreaches( )', which identifies potential data breaches, and 'respondToAnomalies( )', which takes corrective actions against anomalies. The system also includes a Data Storage Module (Class 724) configured to send sanitized data back to the centralized repository for secure storage, ensuring that the sanitized data is securely stored and accessible for future use. Sample functions include 'storeSanitizedData( )', sanitized data, and which securely stores 'retrieveSanitizedData( )', which accesses stored sanitized data.

A Synchronization Module (Class 726) provides a mechanism for real-time updates and synchronization of sanitized data across multiple databases, ensuring that all data repositories maintain consistent and up-to-date records, thereby improving data reliability and accessibility for end-users. Sample functions include 'synchronizeData( )', which ensures data consistency across databases, and 'updateRepositories( )', which performs real-time updates. Finally, an Output Module (Class 728) displays the sanitized data in an output format for final verification, providing a user interface for operators to review and confirm the accuracy and completeness of the sanitized data. Sample functions include 'displayData( )', which presents sanitized data for verification, and 'provideInterface( )', which offers an interface for user review and confirmation. This comprehensive system ensures the intelligent fabrication and secure management of data through an integrated PCM computing framework, leveraging advanced AI and ML capabilities to maintain data integrity, security, and efficient processing.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An AI/ML method for intelligent fabrication of secured data through smart Phase Change Memory (PCM) computing, comprising the steps of:

receiving an input file containing both personal information and non-personal information data, wherein the personal information includes sensitive attributes, and the non-personal information includes general, non-sensitive data;

passing the input file through a central repository, which organizes and stores incoming data for access and processing;

triggering a search request to identify sensitive data in the central repository, utilizing metadata indexing and search algorithms to locate records containing personal information;

performing an intelligent search using a machine learning (ML) model to identify records containing sensitive information in the central repository, where the ML model is trained on labeled datasets of sensitive and non-sensitive data to enhance its accuracy and efficiency in identifying sensitive records;

segregating the records containing sensitive information into segregated sensitive records using an artificial intelligence (AI) and ML module, which analyzes the identified records to separate sensitive data from non-sensitive data;

routing the segregated sensitive records based on a volume of data, determining processing path for each record based on its data volume;

determining if the volume of data exceeds a predefined threshold, which is set to differentiate between high-volume and low-volume data processing requirements;

setting the PCM to a logical '1' state for high data volume, if the volume exceeds the predefined threshold, to facilitate data transactions and throughput;

setting the PCM to a logical '0' state for low data volume, if the volume does not exceed the predefined threshold;

processing the segregated sensitive records within the PCM, using in-memory computing capabilities to sanitize the data without a need for data transfers between processing and storage units;

dynamically switching the PCM between logical '1' and logical '0' states based on the volume of data, optimizing resource usage and processing efficiency for varying data loads;

performing in-memory processing within the PCM to sanitize the segregated sensitive records, applying current levels to switch PCM states and achieve a desired data sanitization;

overwriting existing data directly in the PCM without traditional erasure processes, allowing for faster data updates and reduced wear and tear on memory units;

validating in real-time whether the segregated sensitive records have been sanitized, using validation algorithms to ensure data integrity and prevent redundant processing;

utilizing PCM internal memory to keep track of which records have been sanitized, preventing redundant processing and ensuring that each record is only processed once;

performing in-memory computations within the PCM to handle data transformations and sanitization, reducing the need for data transfers between processing and storage units, thereby minimizing latency and enhancing overall processing speed;

utilizing the AI/ML module to predict future data patterns based on historical data, enabling preemptive allocation of resources and adjusting processing strategies, thus improving responsiveness and efficiency in handling fluctuating data volumes;

incorporating feedback from the AI/ML module to adjust PCM processing parameters dynamically, ensuring that the system remains adaptive and responsive to changing data characteristics and processing requirements;

integrating security protocols within the AI/ML module to detect and respond to potential data breaches or anomalies in real-time, ensuring that sensitive data is protected throughout a processing cycle and enhancing overall security of the system;

sending sanitized data to distributed storage for storage;

including a mechanism for real-time updates and synchronization of sanitized data across multiple databases; and displaying the sanitized data in an output format for final verification, providing a user interface for operators to review and confirm the accuracy and completeness of the sanitized data.

2. The method of claim 1, further comprising the step of training a machine learning model with examples of sensitive and non-sensitive data to improve the accuracy of identifying sensitive records, wherein the training involves feeding the model with labeled datasets and providing feedback on its performance to fine-tune its predictive accuracy, ensuring continuous improvement in an identification process.

3. The method of claim 2, wherein the artificial intelligence and machine learning module continuously learns and adapts based on the data processed to enhance its capability to segregate sensitive records, using iterative training cycles and incorporating new data patterns to refine its classification algorithms, thereby increasing its efficiency and accuracy over time.

4. The method of claim 3, further comprising the step of using a distributed streaming platform to manage and transmit the input file through the central repository, ensuring real-time data streaming and fault tolerance to handle large-scale data input and processing, thereby maintaining system performance and reliability even under heavy loads.

5. The method of claim 4, wherein the search request is triggered to a specific hard drive within the central repository to retrieve the identified sensitive data, optimizing data retrieval speed and accuracy by targeting specific storage locations based on metadata indexing, thus reducing the time and computational resources required for data search and retrieval.

6. The method of claim 5, further comprising the step of displaying the identified sensitive records in output for initial human verification before routing them based on data volume, providing a user interface for operators to review and confirm the records identified for sanitization, thereby ensuring an additional layer of verification and quality control.

7. The method of claim 6, wherein the in-memory processing within the PCM includes applying a high current level to switch the PCM to the logical '1' state for handling high data volumes, facilitating data transactions and throughput for large-scale data sanitization, thereby enhancing the efficiency of a data processing pipeline.

8. The method of claim 7, wherein the in-memory processing within the PCM includes applying a low current level to switch the PCM to the logical '0' state for handling low data volumes.

9. The method of claim 8, further comprising the step of updating the central repository with sanitized data in real-time to ensure most current data is available, using asynchronous data synchronization techniques to minimize latency and ensure data consistency, thereby improving overall reliability of a data processing framework.

10. The method of claim 9, wherein the final verification includes a step of displaying a detailed log of a sanitization process for each record processed to ensure data integrity and accuracy, including timestamps, processing steps, and validation results to provide an audit trail, enabling thorough review and compliance with data governance policies.

11. A system for intelligent fabrication of secured data through smart Phase Change Memory (PCM) computing, comprising:

a data input module configured to receive an input file containing both personal information and non-personal information data, wherein the personal information includes sensitive attributes, and the non-personal information includes general, non-sensitive data;

at least one repository for organizing and storing the incoming data for access and processing;

a search request module configured to trigger a search request to identify sensitive data in said at least one repository, utilizing metadata indexing and search algorithms to locate records containing personal information;

a machine learning (ML) model trained on labeled datasets of sensitive and non-sensitive data to perform an intelligent search to identify records containing sensitive information in the central repository;

an artificial intelligence (AI) and ML module configured to segregate the records containing sensitive information into segregated sensitive records by analyzing the identified records to separate sensitive data from non-sensitive data;

a routing module configured to route the segregated sensitive records based on a volume of data, determining the processing path for each record based on its data volume;

a volume determination module configured to determine if the volume of data exceeds a predefined threshold, which is set to differentiate between high-volume and low-volume data processing requirements;

a PCM module configured to:

set the PCM to a logical '1' state for high data volume, if the volume exceeds the predefined threshold, to facilitate data transactions and throughput;

set the PCM to a logical '0' state for low data volume, if the volume does not exceed the predefined threshold, to ensure data handling;

process the segregated sensitive records within the PCM using in-memory computing capabilities to sanitize the data without the need for data transfers between processing and storage units;

dynamically switch the PCM between logical '1' and logical '0' states based on the volume of data to optimize resource usage and processing efficiency for varying data loads;

perform in-memory processing within the PCM to sanitize the segregated sensitive records, applying current levels to switch the PCM states and achieve the desired data sanitization;

overwrite existing data directly in the PCM without traditional erasure processes to allow for faster data updates and reduced wear and tear on the memory units;

utilize the PCM's internal memory to keep track of which records have been sanitized, preventing redundant processing and ensuring that each record is only processed once;

perform in-memory computations within the PCM to handle data transformations and sanitization, reducing the need for data transfers between processing and storage units, thereby minimizing latency and enhancing overall processing speed;

a validation module configured to validate in real-time whether the segregated sensitive records have been sanitized using validation algorithms to ensure data integrity and prevent redundant processing;

a prediction module within the AI/ML module configured to predict future data patterns based on historical data, enabling the system to preemptively allocate resources and adjust its processing strategies to improve responsiveness and efficiency in handling fluctuating data volumes;

a feedback module within the AI/ML module configured to incorporate feedback to adjust the PCM processing parameters dynamically, ensuring that the system remains adaptive and responsive to changing data characteristics and processing requirements;

an integration module within the AI/ML module configured to integrate security protocols to detect and respond to potential data breaches or anomalies in real-time, ensuring that sensitive data is protected throughout the processing cycle and enhancing the overall security of the system;

a data storage module configured to send sanitized data back to said at least one repository for storage;

a synchronization module configured to provide a mechanism for real-time updates and synchronization of sanitized data across multiple databases; and an output module configured to display the sanitized data in an output format for final verification, providing a user interface for operators to review and confirm accuracy and completeness of the sanitized data.

12. The system of claim 11, wherein the machine learning model is further configured to be trained with examples of sensitive and non-sensitive data to improve the accuracy of identifying sensitive records, involving feeding the model with labeled datasets and providing feedback on its performance to fine-tune its predictive accuracy, ensuring continuous improvement in the identification process.

13. The system of claim 12, wherein the artificial intelligence and machine learning module is further configured to continuously learn and adapt based on the data processed to enhance its capability to segregate sensitive records, using iterative training cycles and incorporating new data patterns to refine its classification algorithms, thereby increasing its efficiency and accuracy over time.

14. The system of claim 13, further comprising a distributed streaming platform configured to manage and transmit the input file through said at least one repository, ensuring real-time data streaming and fault tolerance to handle large-scale data input and processing, thereby maintaining system performance and reliability even under heavy loads.

15. The system of claim 14, wherein the search request module is further configured to trigger the search request to a specific computer-readable medium to retrieve the identified sensitive data, optimizing data retrieval speed and accuracy by targeting specific storage locations based on metadata indexing, thus reducing the time and computational resources required for data search and retrieval.

16. The system of claim 15, further comprising an initial human verification module configured to display the identified sensitive records in the output for initial human verification before routing them based on data volume, providing a user interface for operators to review and confirm the records identified for sanitization, thereby ensuring an additional layer of verification and quality control.

17. The system of claim 16, wherein PCM module in-memory processing capability includes applying a high current level to switch the PCM to the logical '1' state for handling high data volumes, facilitating data transactions and throughput for large-scale data sanitization, thereby enhancing the efficiency of the data processing pipeline.

18. The system of claim 17, wherein the PCM module's in-memory processing capability includes applying a low current level to switch the PCM to the logical '0' state for handling low data volumes.

19. The system of claim 18, wherein the synchronization module is further configured to update said distributed streaming platform with sanitized data in real-time to ensure the most current data is available, using asynchronous data synchronization techniques to minimize latency and ensure data consistency across the system, thereby improving the overall reliability of the data processing framework.

20. An AI/ML method for intelligent fabrication of secured data through smart Phase Change Memory (PCM) computing, comprising the steps of:

receiving an input file containing both personal information and non-personal information data;

passing the input file through a central repository;

triggering a search request to identify sensitive data in the central repository;

performing an intelligent search using a machine learning (ML) model to identify records containing sensitive information in the central repository;

segregating the records containing sensitive information into segregated sensitive records using an artificial intelligence (AI) and ML module;

routing the segregated sensitive records based on a volume of data;

determining if the volume of data exceeds a predefined threshold;

setting the PCM to a logical '1' state for high data volume, if the volume exceeds the predefined threshold;

setting the PCM to a logical '0' state for low data volume, if the volume does not exceed the predefined threshold;

processing the segregated sensitive records within the PCM;

dynamically switching the PCM between logical '1' and logical 'O' states based on the volume of data;

performing in-memory processing within the PCM to sanitize the segregated sensitive records;

overwriting existing data directly in the PCM without traditional erasure processes;

validating in real-time whether the segregated sensitive records have been sanitized;

sending sanitized data to distributed storage for storage; and displaying the sanitized data in an output format for final verification.

* * * * *